(12) United States Patent
Laroussini

(10) Patent No.: US 12,514,342 B1
(45) Date of Patent: Jan. 6, 2026

(54) LINKS AND HINGE FOR JEWELRY

(71) Applicant: Sheila Laroussini, Lagrange, GA (US)

(72) Inventor: Sheila Laroussini, Lagrange, GA (US)

( * ) Notice: Subject to any disclaimer, the term of this patent is extended or adjusted under 35 U.S.C. 154(b) by 0 days.

(21) Appl. No.: 19/191,749

(22) Filed: Apr. 28, 2025

(51) Int. Cl.
*A44C 5/10* (2006.01)

(52) U.S. Cl.
CPC .................................. *A44C 5/102* (2013.01)

(58) Field of Classification Search
CPC ........... A44C 5/08; A44C 5/102; A44C 5/105; A44C 5/10; A44C 5/04; A44C 11/00; F16G 15/12; F16G 15/00; F16G 13/12; B21L 11/02; B21L 11/08
USPC .................................................. 59/83; 16/373
See application file for complete search history.

(56) References Cited

U.S. PATENT DOCUMENTS

| | | | | |
|---|---|---|---|---|
| 809,134 | A * | 1/1906 | Reece | E05D 5/02 16/373 |
| 996,478 | A * | 6/1911 | Francis | F16G 15/00 24/270 |
| 1,312,944 | A * | 8/1919 | Bellow | E05D 5/02 16/373 |
| 5,636,506 | A * | 6/1997 | Yngvesson | F16G 13/12 59/80 |
| 11,470,924 | B2 * | 10/2022 | Laroussini | A44C 5/08 |

* cited by examiner

*Primary Examiner* — Jack W Lavinder
(74) *Attorney, Agent, or Firm* — Mathew L. Grell, Esq.; Grell & Watson Patent Attorneys LLC

(57) ABSTRACT

A link system having a first piece and a second piece both including an elongated portion, a first end extending from the elongated portion and curved to form a first opening, and a second end extending from the elongated portion curved to form a second opening wherein the curved ends forming the opening of the second piece extend respectively through the openings of the first piece to interlock the first piece with the second piece and wherein the openings of the first piece are movable along the curved portion forming the openings of the second piece respectively such that the hinge is adjustable.

14 Claims, 22 Drawing Sheets

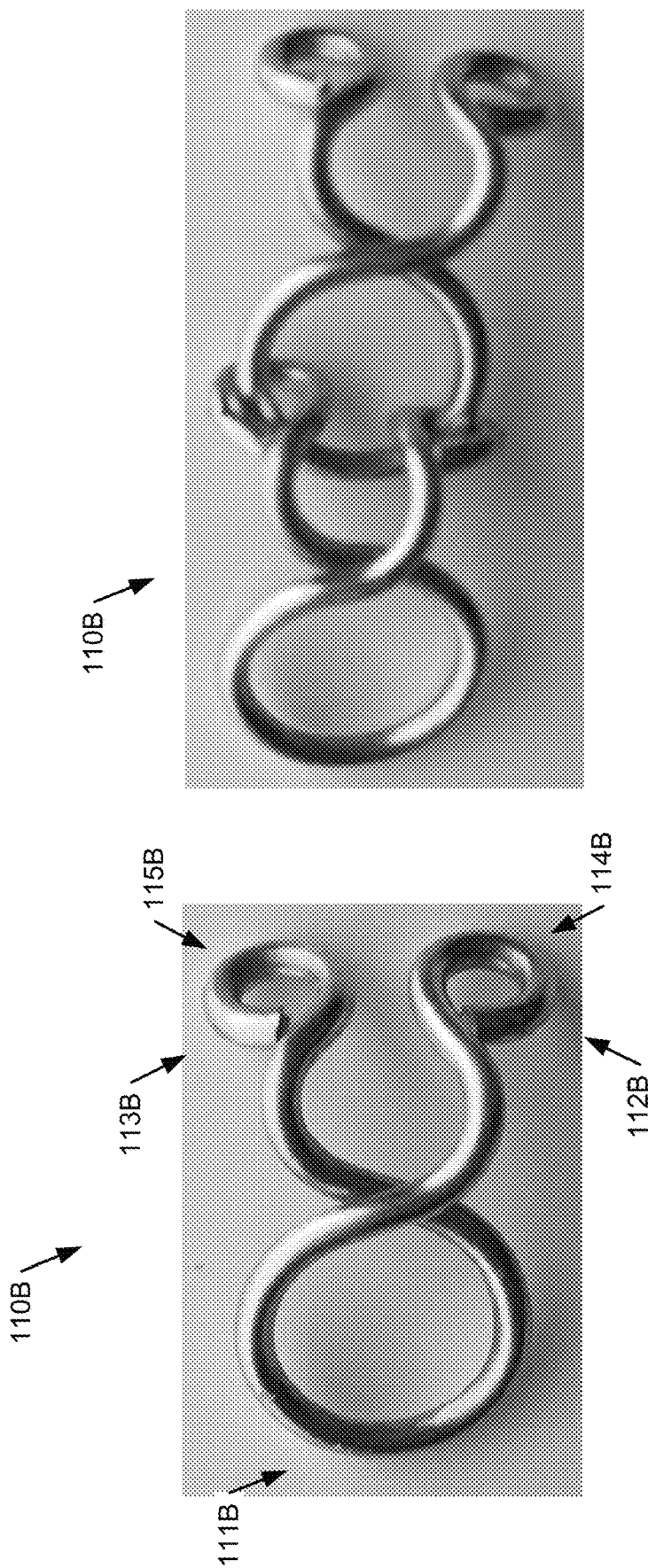

613

LINKS AND HINGE FOR JEWELRY

FIELD OF THE DISCLOSURE

This disclosure relates to implementations of a novel hinge for jewelry.

BACKGROUND

Necklaces, bracelets, or other jewelry often need to be resized to reduce or increase the length of such jewelry for a desired fit or appearance on a wearer. However, such resizing usually requires a tedious, difficult process to be performed by a jeweler, such as removing or adding pieces to the jewelry. There does not exist a connectable, adjustable length component that can be used to make jewelry, clasps, or other similar items that can be easily adjusted in length by a wearer or other user.

BRIEF DESCRIPTION OF THE DRAWINGS

FIGS. 1F-1G illustrate an alternate implementation of an example first piece of the expandable link according to the present disclosure;

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Implementations of a novel hinge is provided. In some implementations, the hinge comprises a first piece and a second piece moveably connected in a hinge-like configuration. In some implementations, the hinge is configured to be used in jewelry.

In some implementations, the hinge may be configured to be used in any other suitable manner where a hinge may be used.

In some implementations, a method of using the hinge comprises connecting jewelry to the hinge and opening and closing the hinge to increase or reduce the length of jewelry.

Figure 1A:
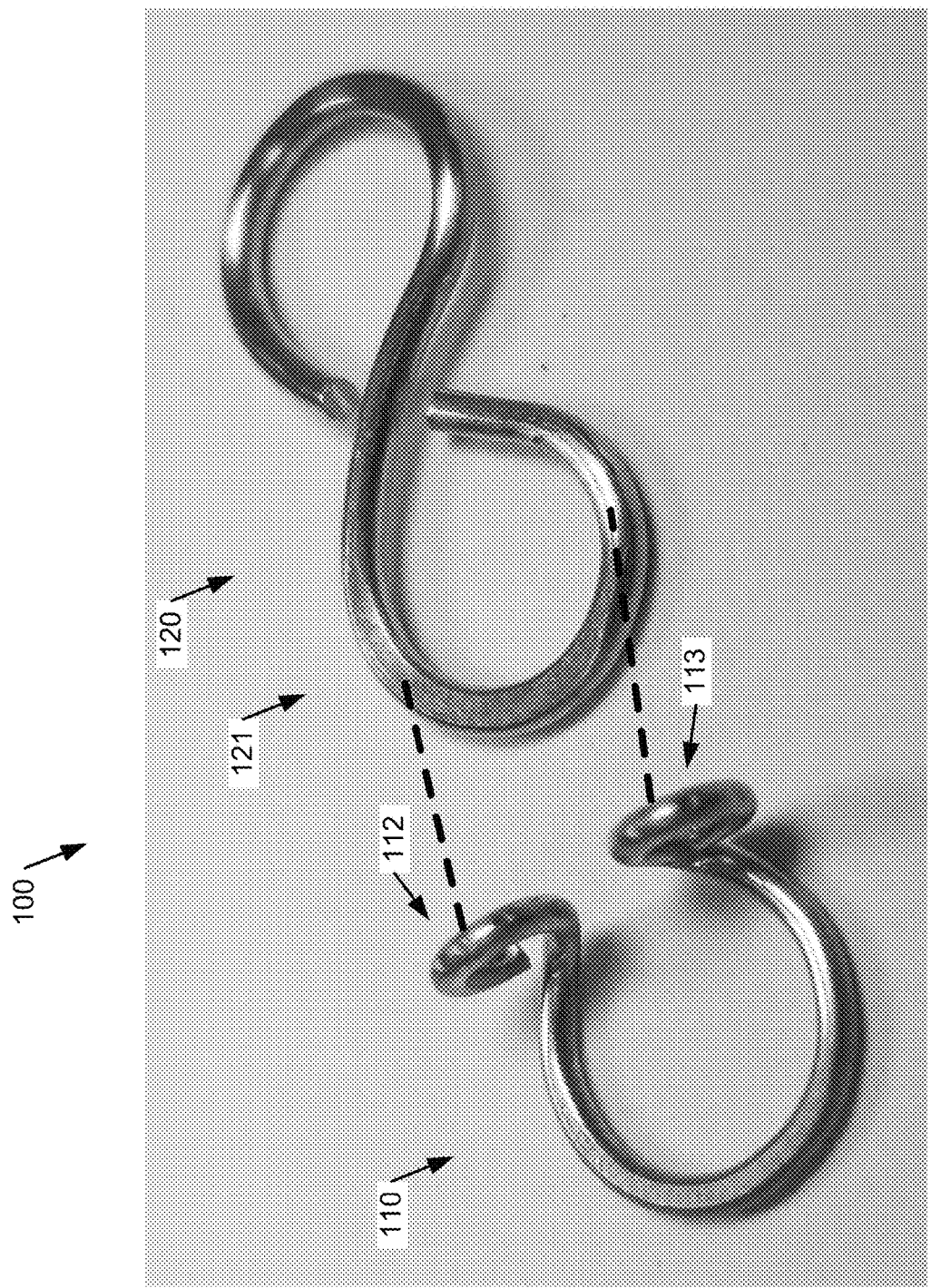
FIG. 1A illustrates an exploded view of implementation of a two part example expandable link according to the present disclosure.

FIG. 1A illustrates an exploded view of an implementation of an example expandable link system 100 according to the present disclosure. As shown in FIG. 1A, in some implementations, the expandable link 100 comprises first piece 110 and second piece 120 shown as a figure eight shaped configuration and dotted lines where first piece 110 may interlink therewith second piece 120.

Figure 1C:
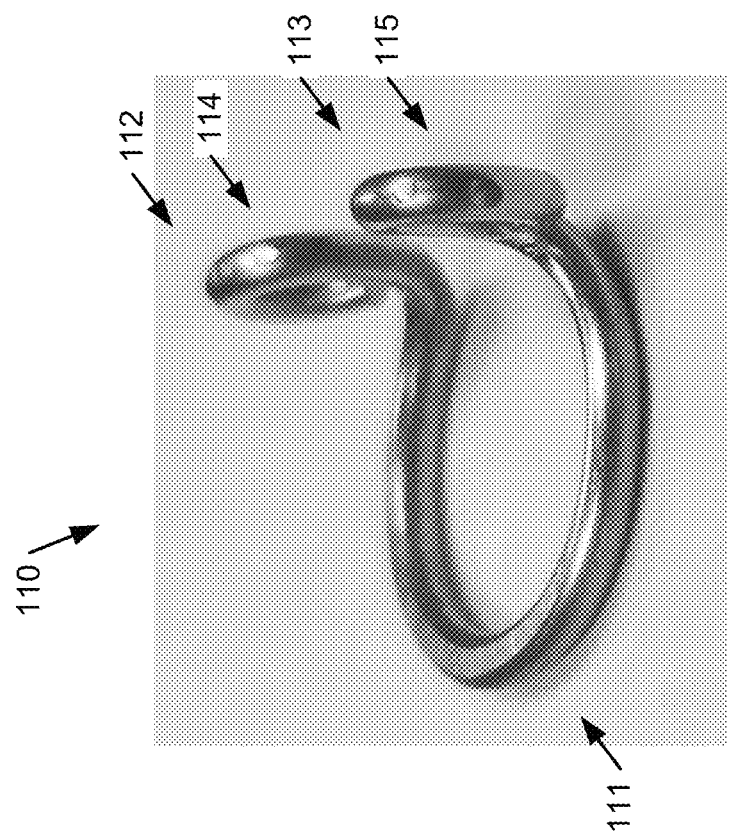
FIGS. 1B-1D illustrate various views of an implementation of an example first piece of the expandable link according to the present disclosure.
Figure 1B:
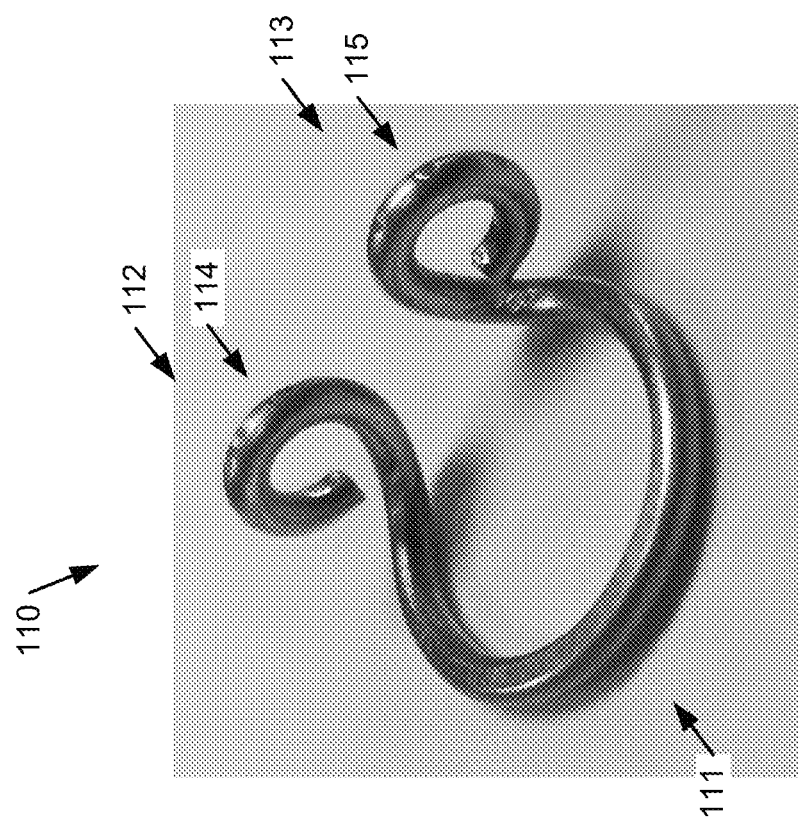
Figure 1E:
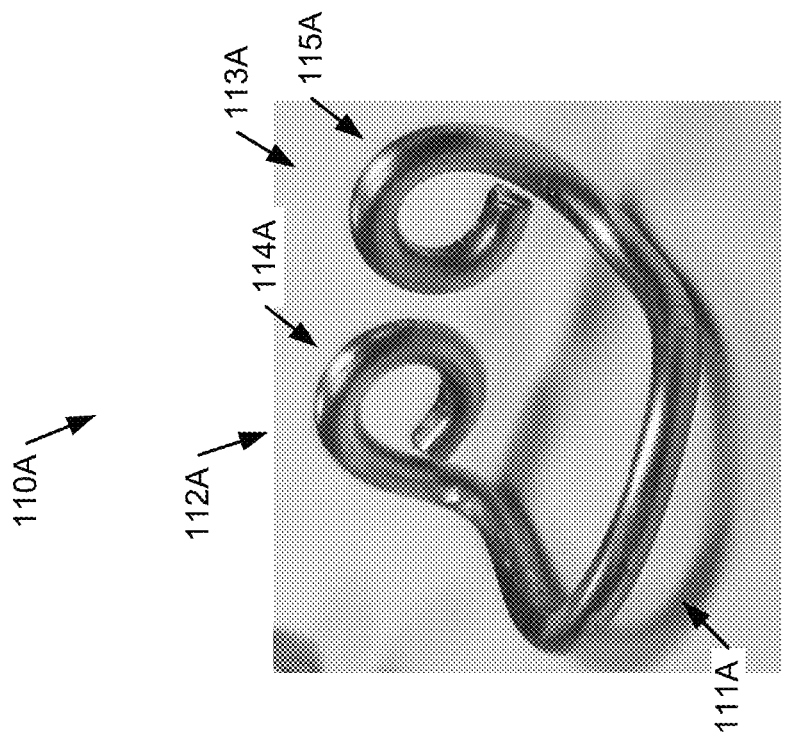
FIG. 1E illustrates another implementation of an example first piece of the expandable link according to the present disclosure.
Figure 1D:
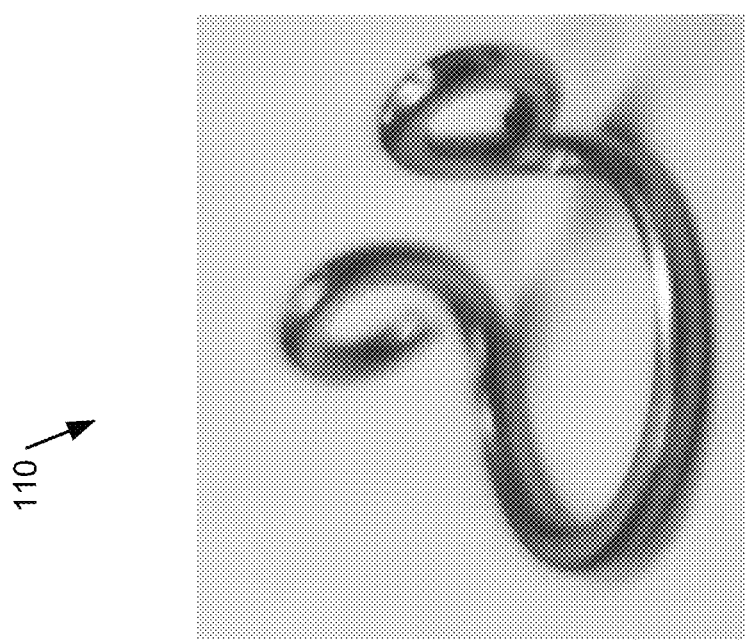

FIGS. 1B-1D illustrate various views of an implementation of an example first piece 110 of the expandable link according to the present disclosure. As shown in FIG. 1B-D, in some implementations, first piece 110 comprises first elongated portion, circular or arcing section in a first plane, such as curved portion 111, first opening, such as first loop end 114, second opening, such as second loop end 115, first bend 112 being a transition from curved portion 111 to first loop end 114 in a second plane, and second bend 113 being a transition from curved portion 111 to second loop end 115 in a third plane.

In some implementations, first end 112/A is bent 90 degrees (nearly or about 90 degrees or in some cases acute) from curved portion 111/A. For example, as shown in FIG. 1C, when curved portion 111 is positioned generally horizontal, such as on a table, first end 112 extends generally vertical from curved portion 111. As shown in FIG. 1B, in some implementations, first end 112 is also curved outward to form first opening 114.

In some implementations, second piece 110 (similar to first piece as shown in FIGS. 3A-3D shown interlocked) includes second elongated portion, circular or arcing section in a third plane, such as curved portion 111, third opening, such as first loop end 114, fourth opening, such as second loop end 115, first bend 112 being a transition from curved portion 111 to first loop end 114 in a fourth plane, and second bend 113 being a transition from curved portion 111 to second loop end 115 in a fifth plane.

In some implementations, first end 112/A is bent 90 degrees (or about 90 degrees) from curved portion 111/A. For example, as shown in FIG. 1C, when curved portion 111 is positioned generally horizontal, such as on a table, first end 112 extends generally vertical from curved portion 111. As shown in FIG. 1B, in some implementations, first end 112 is also curved outward to form first opening 114.

As shown in FIG. 1B, in some implementations, similar to first end 112, second end 113 is bent 90 degrees (or about 90 degrees) from curved portion 111 and is curved outward to form second opening 115. In some implementations, second end 113 is curved outward in an opposite facing direction from first end 112.

FIG. 1E illustrates an alternate implementation of an example first piece 110A of expandable link 100 according to the present disclosure. In some implementations, first piece 110A is generally same or similar to first piece 110 described above for FIGS. 1B-1D. For example, as shown in FIG. 1E, in some implementations, first piece 110A comprises circular or arc, such as curved portion 111A, first loop end 114A, second loop end 115A, first bend 112A, and second bend 113A that are generally the same or similar to the like-named components of first piece 110. As shown in FIG. 1E, in some implementations, first piece 110A comprises a circular or arcing section, such as curved portion 111A, first loop end 114A, second loop end 115A, first bend 112A being a transition from curved portion 111A to first loop end 114A, and second bend 113A being a transition from curved portion 111A to second loop end 115A.

As shown in FIG. 1E, in some implementations, generally the same or similar to first piece 110, loop ends 114A, 115A are bent respectively 90 degrees (or about 90 degrees) from curved portion 111A. However, in some implementations, loop ends 114A, 115A are curved inward respectively to form bends 112A, 113A. That is, in some implementations, loop ends 112A, 113A are curved inward respectively facing toward each other. First piece 110A differs from first piece 110 in that first loop end 114A and second loop end 115A rotate or curve inward or counter-clockwise whereas for first piece 110 first loop end 114, second loop end 115 rotate or curve outward or clockwise.

FIGS. 1F-1G illustrate another alternate implementation of an example first piece 110B of expandable link 100 according to the present disclosure. In some implementations, first piece 110B is generally the same or similar to first piece 110 described above for FIGS. 1B-1D. For example, as shown in FIG. 1F, in some implementations, first piece 110B comprises a circular or arc, such as curved portion 111B, first loop end 114B, second loop end 115B, wherein first loop end 114B and second loop end 115B cross over one another, a first bend 114B, and second bend 115B that are generally the same or similar to the like-named components of first piece 110.

As shown in FIG. 1F, in some implementations, generally the same or similar to first piece 110, loop ends 112B, 113B are bent respectively 90 degrees (or about 90 degrees) from curved portion 111B and are curved outward respectively to form bends 114B, 115B. As shown in FIG. 1F, in some implementations, first piece 110B comprises a circular or arcing section, such as curved portion 111B, first loop end 114B, second loop end 115B, first bend 112B being a transition from curved portion 111B to first loop end 114B, and second bend 113B being a transition from curved portion 111B to second loop end 115B.

However, as shown in FIG. 1F, in some implementations, loop ends 112B, 113B extending from curved portion 111B cross over each other to the opposite sides of curved portion 111B (e.g., in contrast to loop ends 114, 115 of first piece 110 in FIGS. 1B-1D). In some implementations, loop ends 114B, 115B may cross over before or after bending from curved portion 111B.

In some implementations, as shown in FIG. 1G, the cross over design of loop ends 114B, 115B allows a user to apply additional sufficient elongation or retraction force (e.g., by squeezing together the sides of curved portion 111B) to reposition (retract or linear elongate the pair of first pieces 110B) first piece 110B from an original or first position to another or second position along second piece 110B, as described more below with respect to FIGS. 2A-2C.

Figures 1H, 1I:
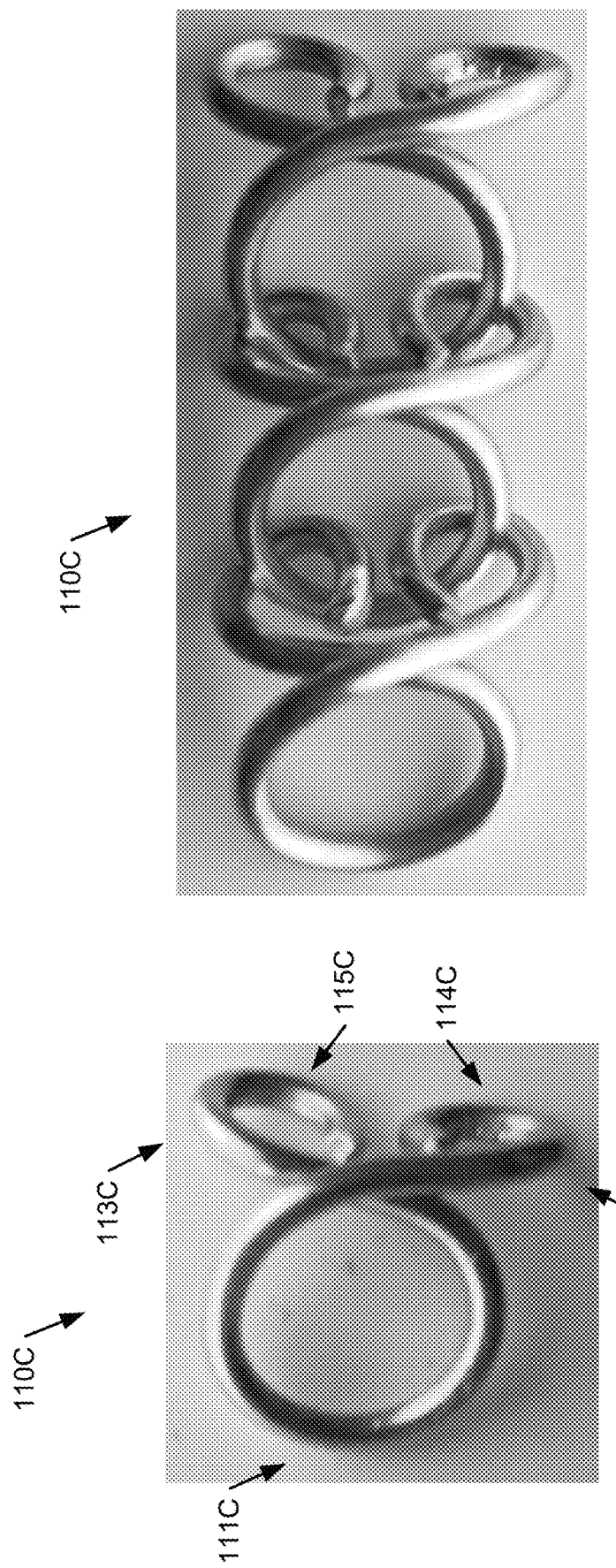
FIGS. 1H-1I illustrate another implementation of an example first piece of the expandable link according to the present disclosure.

FIGS. 1H-1I illustrate another alternate implementation of an example first piece of the expandable link according to the present disclosure. In some implementations, first piece 110C is generally the same or similar to first piece 110A described above for FIG. 1E. For example, as shown in FIG. 1H, in some implementations, first piece 110C comprises circular or arc section, such as curved portion 111C, first loop end 114C, second loop end 115C, a firstbend 112C, and second bend 113C that are generally the same or similar to the like-named components of first piece 110A.

As shown in FIG. 1H, in some implementations, generally the same or similar to first piece 110A, loop ends 112C, 113C are bent respectively 90 degrees (or about 90 degrees) from curved portion 111C and are curved inward respectively to form bends 114C, 115C. As shown in FIG. 1H, in some implementations, first piece 110C comprises a circular or arcing section, such as curved portion 111C, first loop end 114C, second loop end 115C, first bend 112C being a transition from curved portion 111C to first loop end 114C, and second bend 113C being a transition from curved portion 111C to second loop end 115C.

However, as shown in FIG. 1H, in some implementations, loop ends 112C, 113C extending from curved portion 111C cross over one another (first end of elongated section crosses over second end of elongated section), or each other to the opposite sides of curved portion 111C (e.g., in contrast to loop ends 112A, 113A of first piece 110A in FIG. 1E). In some implementations, loop ends 112C, 113C may cross over before or after bending from curved portion 111C.

In some implementations, the cross over design of loop ends 112C, 113C allows a user to apply additional sufficient force (e.g., by squeezing together the sides of the curved portion 111C) to reposition (retract or elongate the pair of first pieces 110C) first piece 110C to another position along second piece 110C, third pieces 110C . . . , as described more below with respect to FIGS. 2A-2C.

In some implementations, the descriptions herein of first piece 110 with respect to expanding link 100 also suitably apply and/or imply reference to the above-described alternate implementation first pieces 110A, 11B, and/or 11C, as will be recognized by one skilled in the art with the benefit of the present disclosure.

Figure 1J:
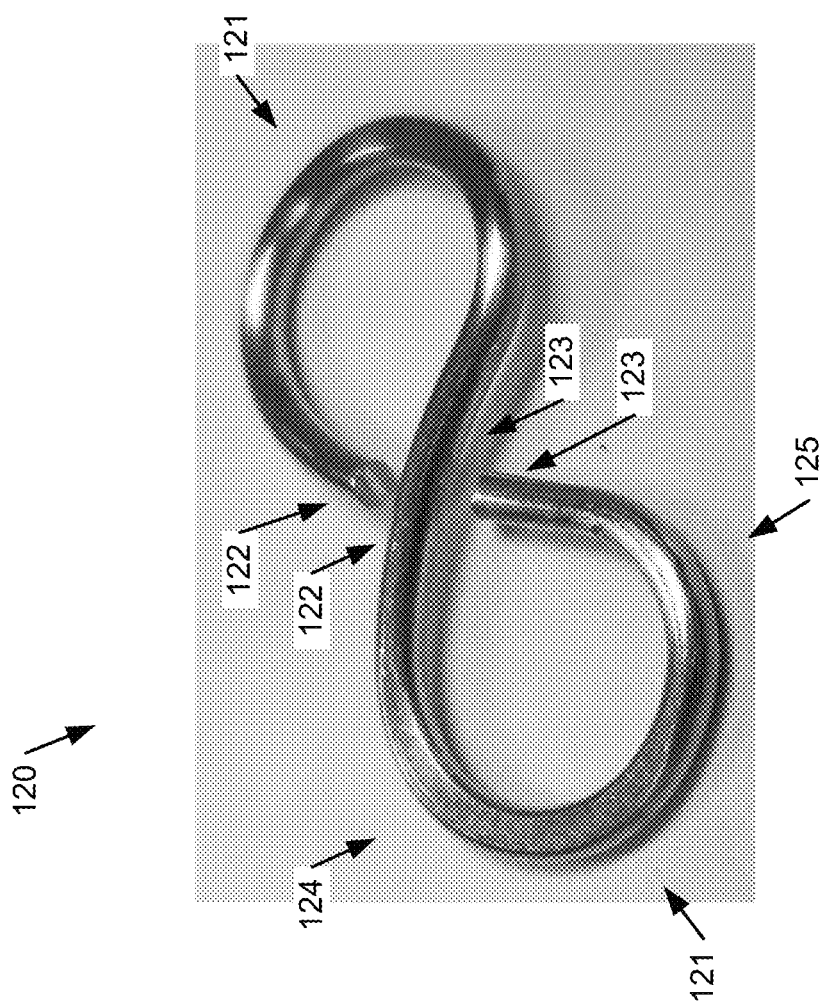
FIG. 1J illustrates an implementation of an example second piece of the expandable link according to the present disclosure.

FIG. 1J illustrates an implementation of an example second piece 120 of expandable link 100 according to the present disclosure. As shown in FIG. 1J, in some implementations, figure eight, such as second piece 120 may include oval or arc section, such as curved portions 121, first end 122, and second end 123. In some implementations, curved portions 121 may include first side 124 and second side 125.

In some implementations, curved portion 121 may be similar to the above-described curved portion 111 of first piece 110. However, in some implementations, ends 122, 123 extend from curved portion 121 to form a loop or semi-loop. For example, in some implementations, ends 122, 123 extend coplanar or generally coplanar to the curved portion 121 and all lie on a single plane.

In some implementations, curved portion 121 and ends 122, 123 form a circular or semi-circular loop. In some implementations, curved portion 121 and ends 122, 123 form a loop or semi-loop of any other suitable shape or size.

As shown in FIG. 1J, in some implementations, second piece 120 may comprise a pair of curved portions 121 and ends 122, 123 that connect to form a figure eight shaped loop (or double loop). Alternately, in some implementations, second piece 120 may comprise form of a single loop or ring (such as shown in FIG. 4D) or of three or more loops or rings (not shown) from the curved portion(s) 121 and the ends 122, 123.

Figure 2A:
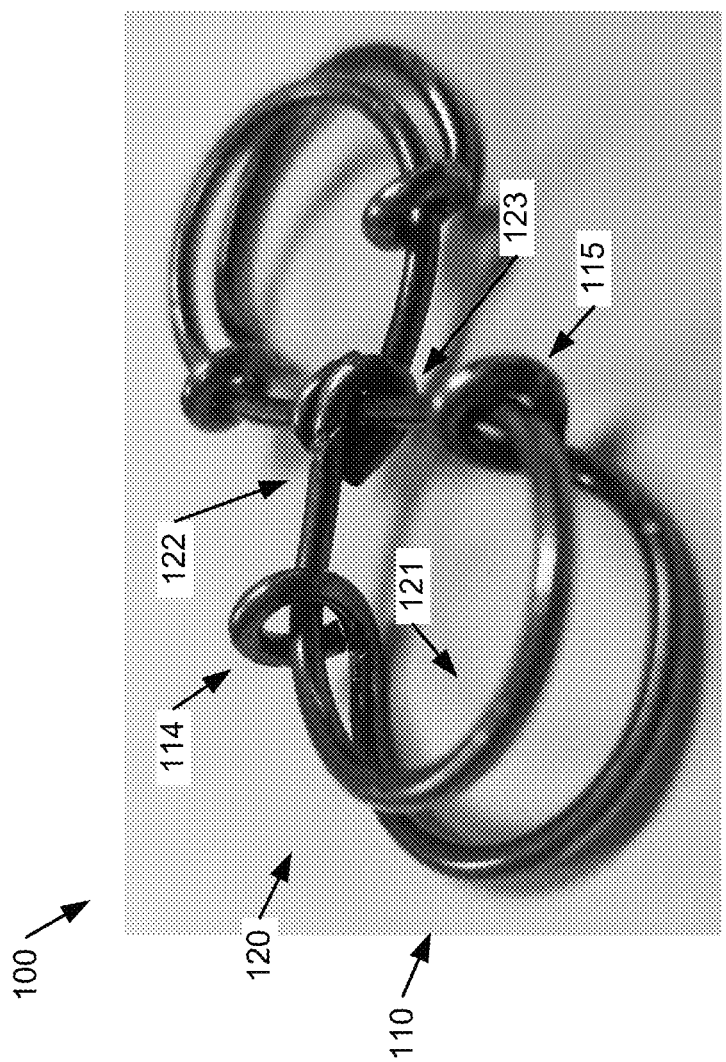
FIGS. 2A-2C illustrate an assembled view of an alternate expandable link shown retracted and then elongated according to the present disclosure.
Figure 2B:
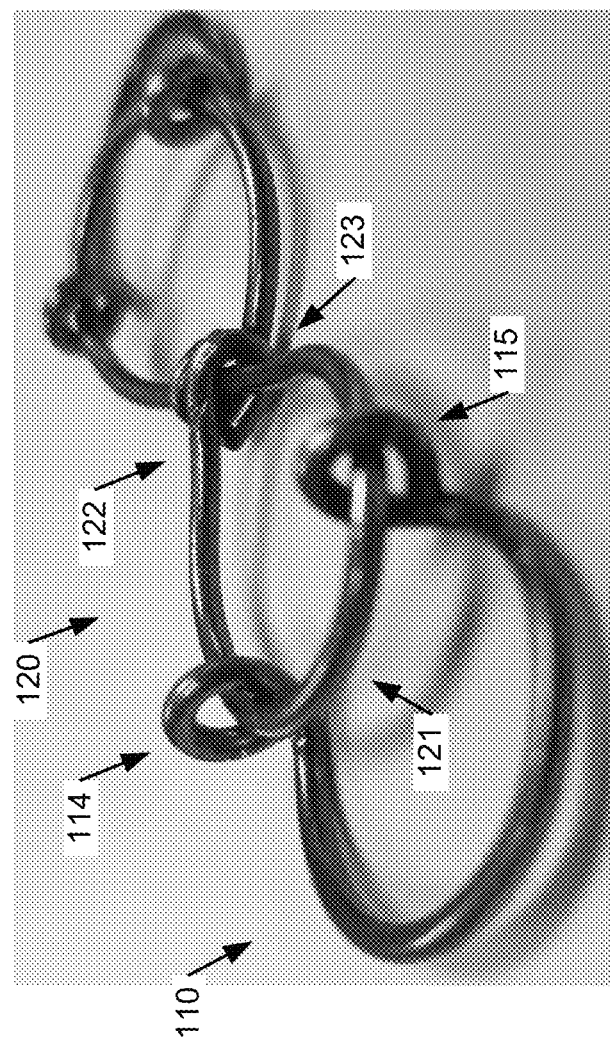
Figure 2C:
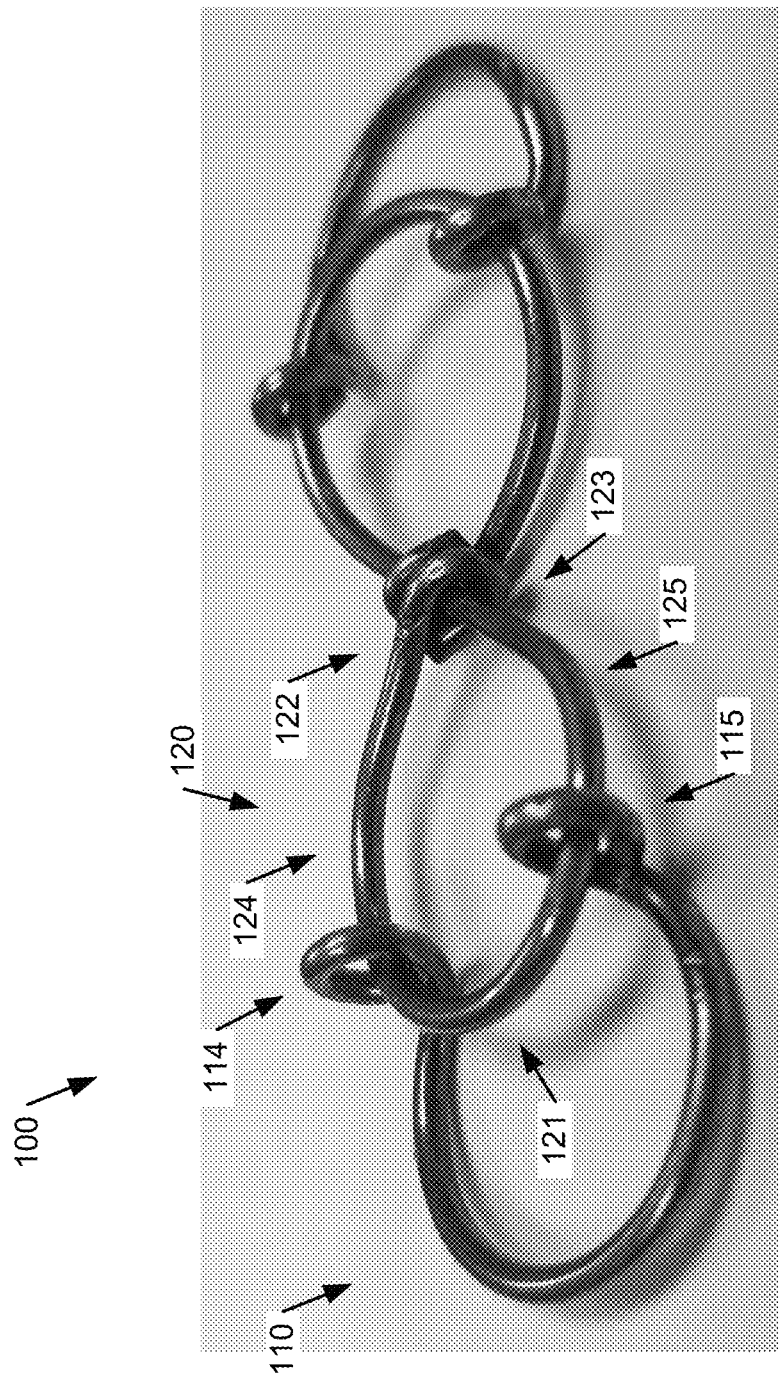

FIGS. 2A-2C illustrate an assembled view of the expandable link assembly 100 according to the present disclosure. As shown in FIGS. 2A-2C, in some implementations, expandable link assembly 100 may include the above-described first piece 110 (or alternate implementation first piece 110A, 110B, or 110C) and second piece 120.

As shown in FIGS. 2A-2C, in some implementations, first pieces 110 and second piece 120 are moveably/adjustably (relative to one another form an original or first position to another or second position) and connected together, such as first pieces 110 retract or elongate the pair of first pieces 110). First pieces 110 allows a user to apply additional sufficient force (e.g., by squeezing together the sides of first pieces 110 to reposition (retract or elongate the pair of first pieces 110) to another position along second piece 120. That is, in some implementations, sides 124, 125 of the curved portion 121 (as shown in FIG. J) extend respectively through loop ends 114, 115 of the first pieces 110. In this way, in some implementations, first piece 110 and the second piece 120 are moveably/adjustably interlocked to enable elongation and retraction of first pieces 110 to another position along second piece 120.

As shown in FIGS. 2A-2C, in some implementations, first piece 110 and second piece 120 are connected/interlocked such that the length of expandable link 100 is adjustable by positioning first piece 110 along different positions (retract and elongate) of curved portion 121 of second piece 120. For example, as shown in FIG. 2A, in some implementations, the length of expandable link 100 can be reduced or shortened by positioning first pieces 110 so that loop ends 114, 115 are nearer respectively to loop ends 122, 123 of the second piece 120 figure eight center. Moreover, second piece 120 may include loop ends 122, 123 wrapped there around to secure second piece 120 in a figure eight configuration.

Similarly, as shown in FIGS. 2B and 2C, in some implementations, the length of the expandable link 100 can be increased or lengthened by positioning the first pieces 110 so that loop ends 114, 115 are farther away respectively from ends 122, 123 of second piece 120.

In some implementations, the shape (e.g., the curvature) of the first pieces 110 and/or of second piece 120 may be configured such that first pieces 110 will remain in a position along curved portion 121 of second piece 120 until sufficient elongation force is used to reposition first piece 110 to another position along the second piece 120. In this way, in some implementations, first pieces 110 and second piece 120 are configured such that first piece 110 snugly and/or securely positions along second piece 120.

As shown in FIGS. 1A, 2A-C, and FIGS. 3B and 4B (described below), first pieces 110 and the second piece 120 may include any curved shape so long as the first pieces 110 includes the above-described 90 degree bend (or about 90 degree bend) on bends 112, 113 (as described above) and the first pieces 110 can move along the curved portion 121 of next first piece 110 or second piece 120 (as also described above).

Figure 3A:
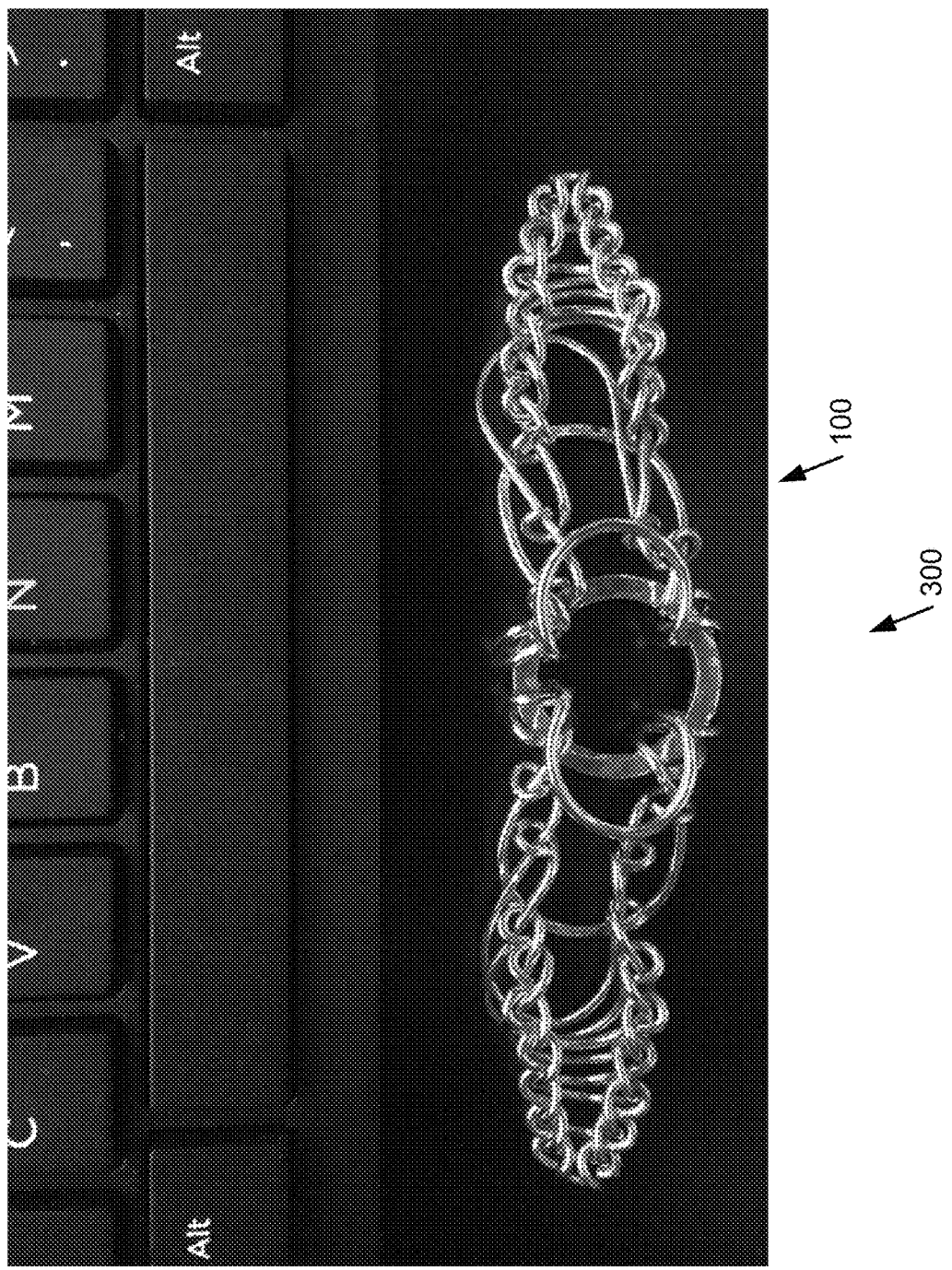
FIGS. 3A-3D illustrate examples of adjustable length jewelry made from different size first pieces of the expandable link shown retracted and then elongated according to the present disclosure.
Figure 3B:
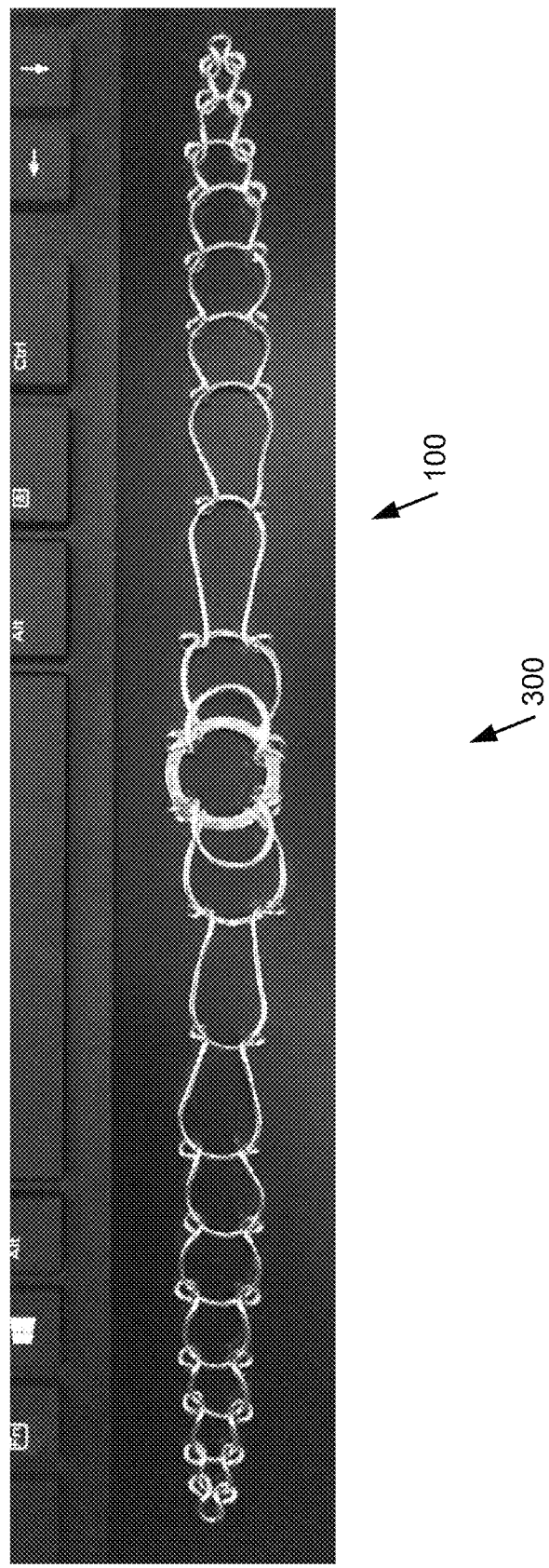
Figure 3C:
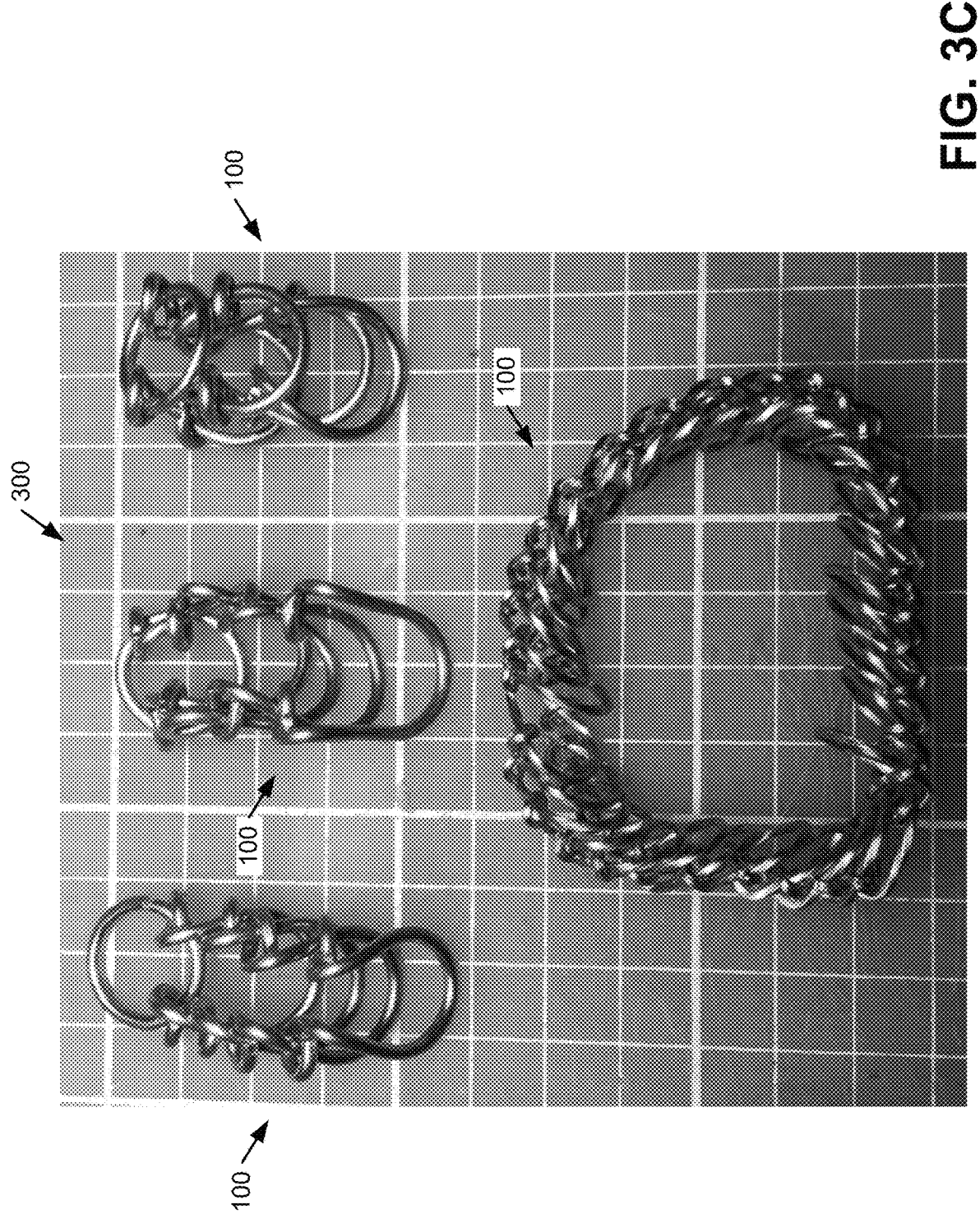
Figure 3D:
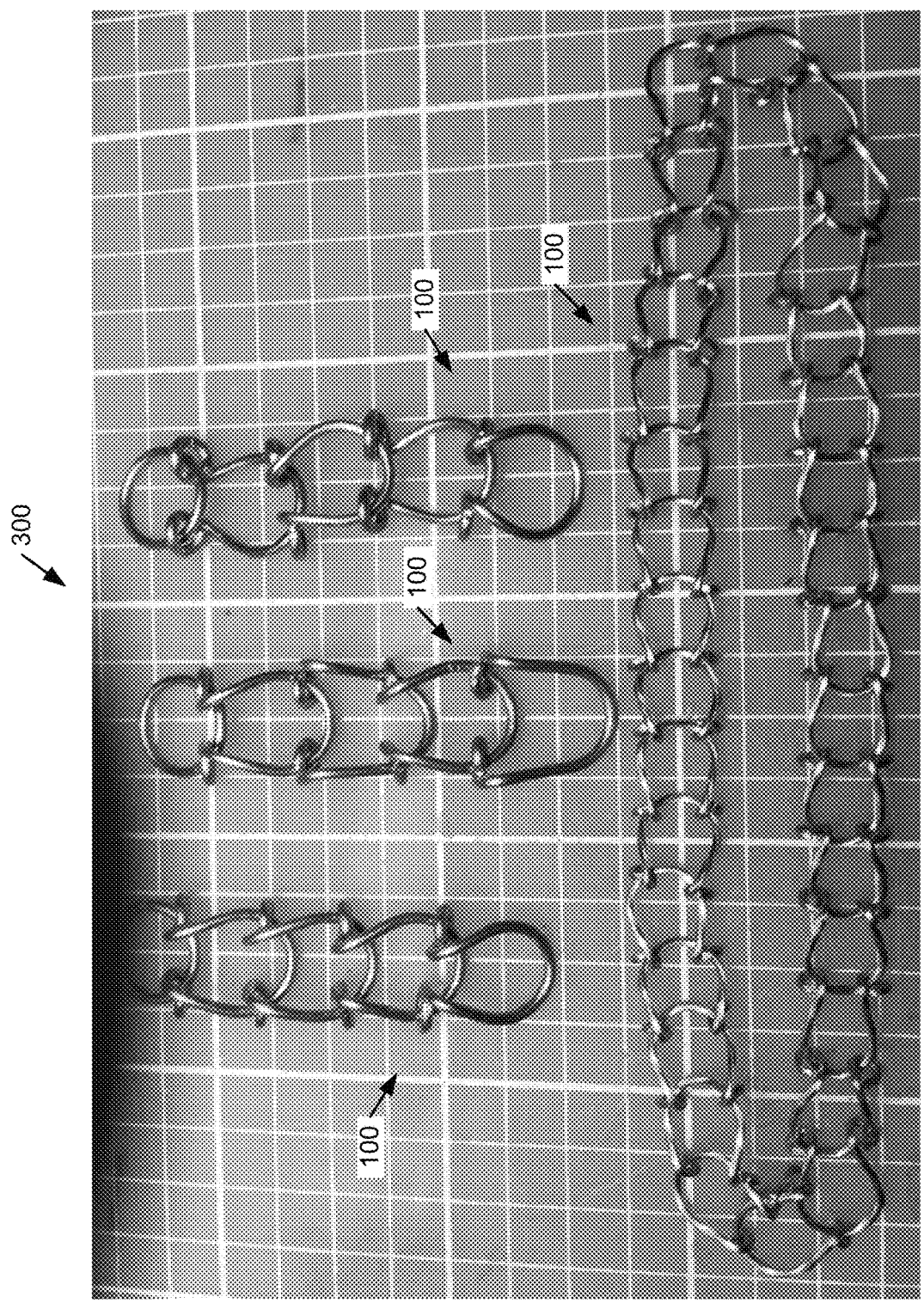

As shown in FIG. 3D (described below), in some implementations, second piece 120 may include the same shape as first piece 110, such as first piece 110. For example, in some implementations, a plurality of first pieces 110, such as shown in FIG. 1B, may be nested together as a linear set of links to form jewelry from expandable link 100, such as shown in FIG. 3D.

It will be understood by one skilled in the art with the benefit of the present disclosure that components of the expandable link 100, such as the pieces 110, 120, may be made by hand, machine, or any other suitable way. In that regard, the bends in the pieces 110, 120 of about 90 degrees (e.g., indicating 90 degrees, less than 90 degrees, or greater than 90 degrees) described herein will be understood by one skilled in the art to be the result of variation, tolerance, error, etc. during the making of the expandable link 100 by hand, machine, or other suitable way.

In some implementations, the expandable link 100 is configured to be adjustable in length.

In some implementations, the expandable link 100 is configured to be used in adjustable length jewelry. In some implementations, the expandable link 100 is configured to be used in adjustable length clasps.

In some implementations, the expandable link 100 may be configured to be used in any other suitable adjustable length usage.

FIGS. 3A-3D illustrate examples of adjustable length jewelry 300 made from the expandable links 100 according to the present disclosure and disclosed above. For example, as shown in FIGS. 3A-3D, in some implementations, a plurality of the expandable links 100 may be connected together or interlinked to form an adjustable length necklace, bracelet, or other jewelry 300 that may elongate and retract in linear length (between a first position and second position enabling a first length and a second length, wherein second length is a longer distance in length).

Figure 4A:
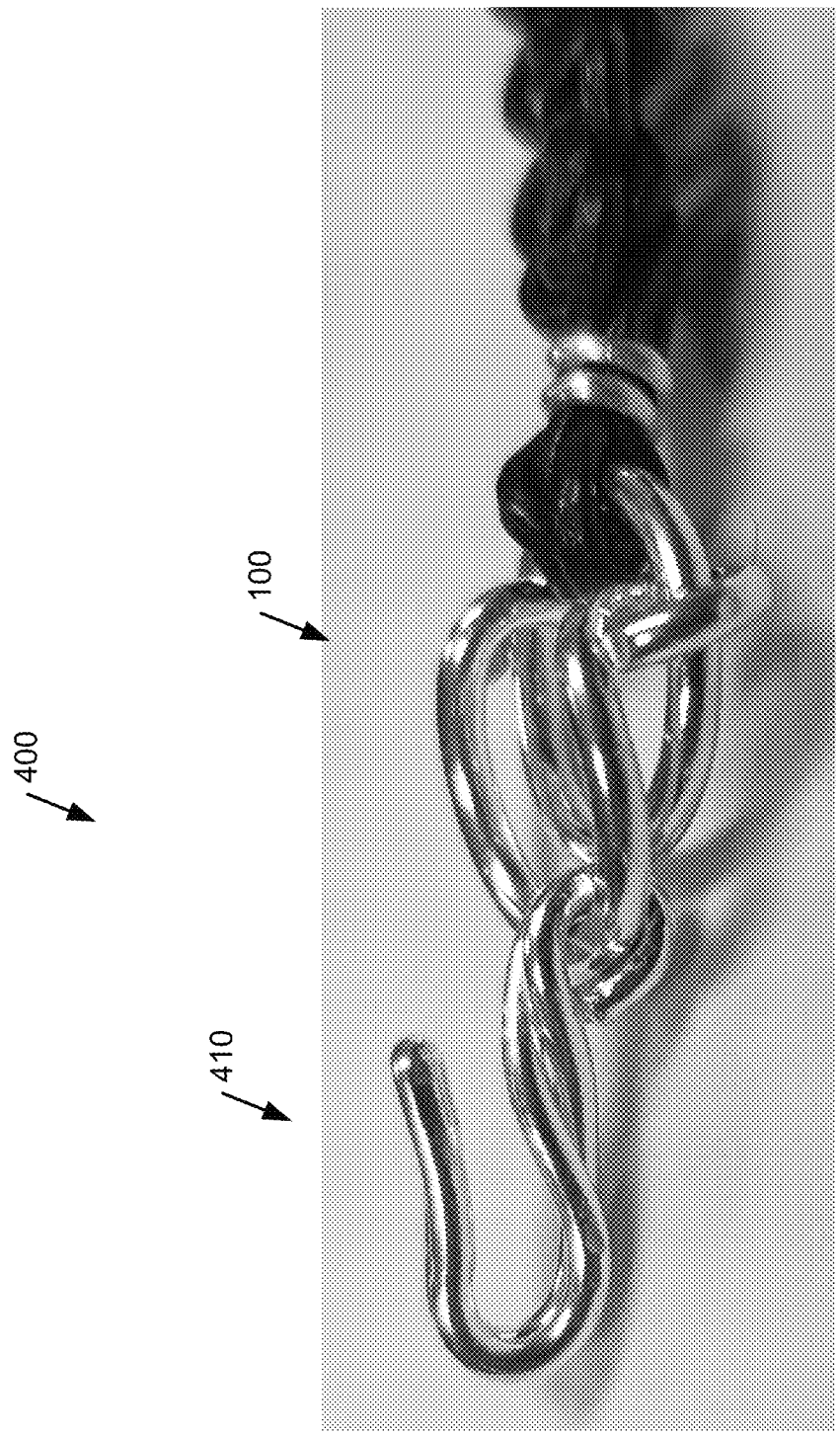
FIGS. 4A-4D illustrate examples of adjustable length clasps made from first pieces of the expandable link shown retracted and then elongated according to the present disclosure.
Figure 4B:
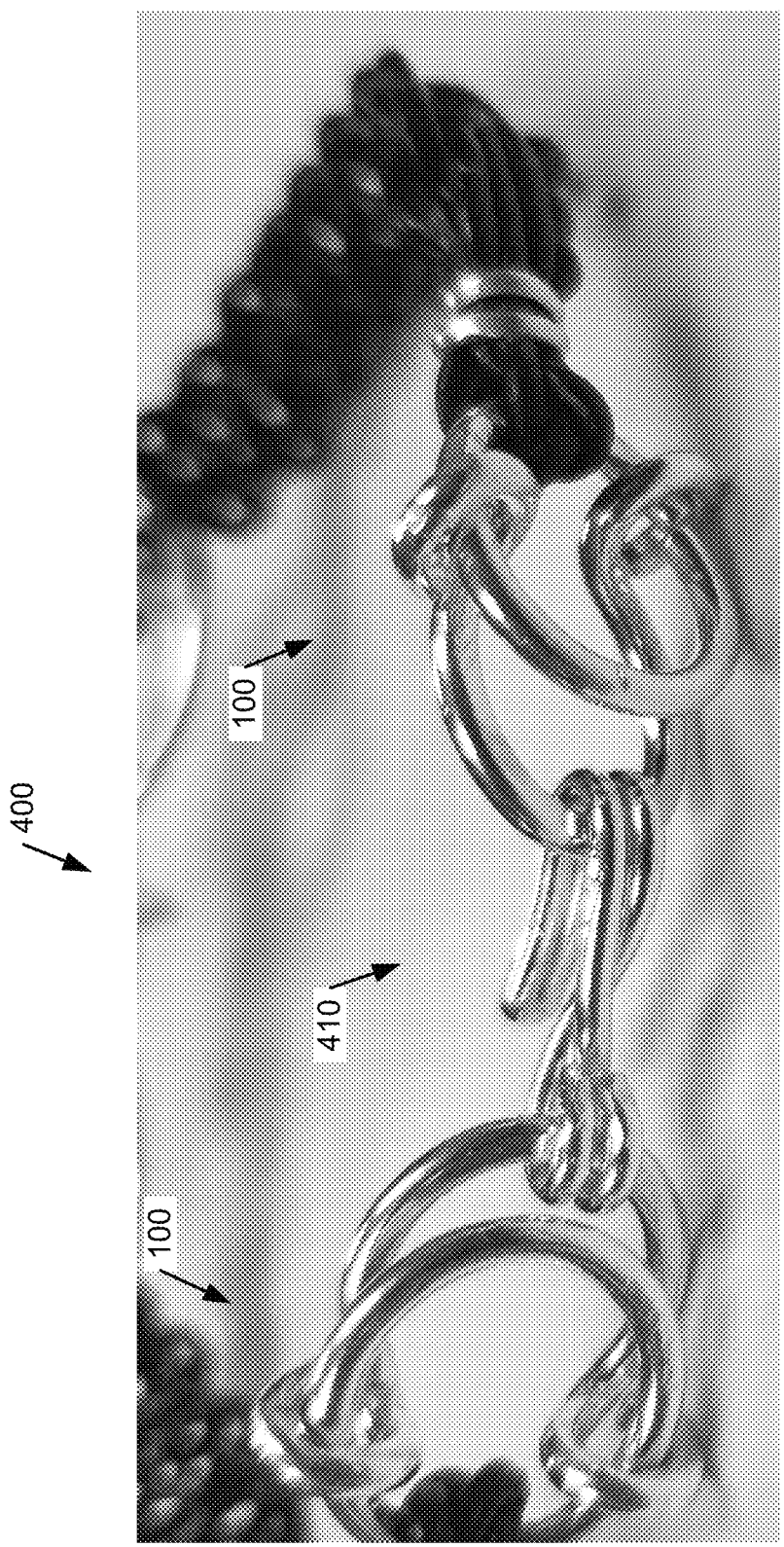
Figure 4C:
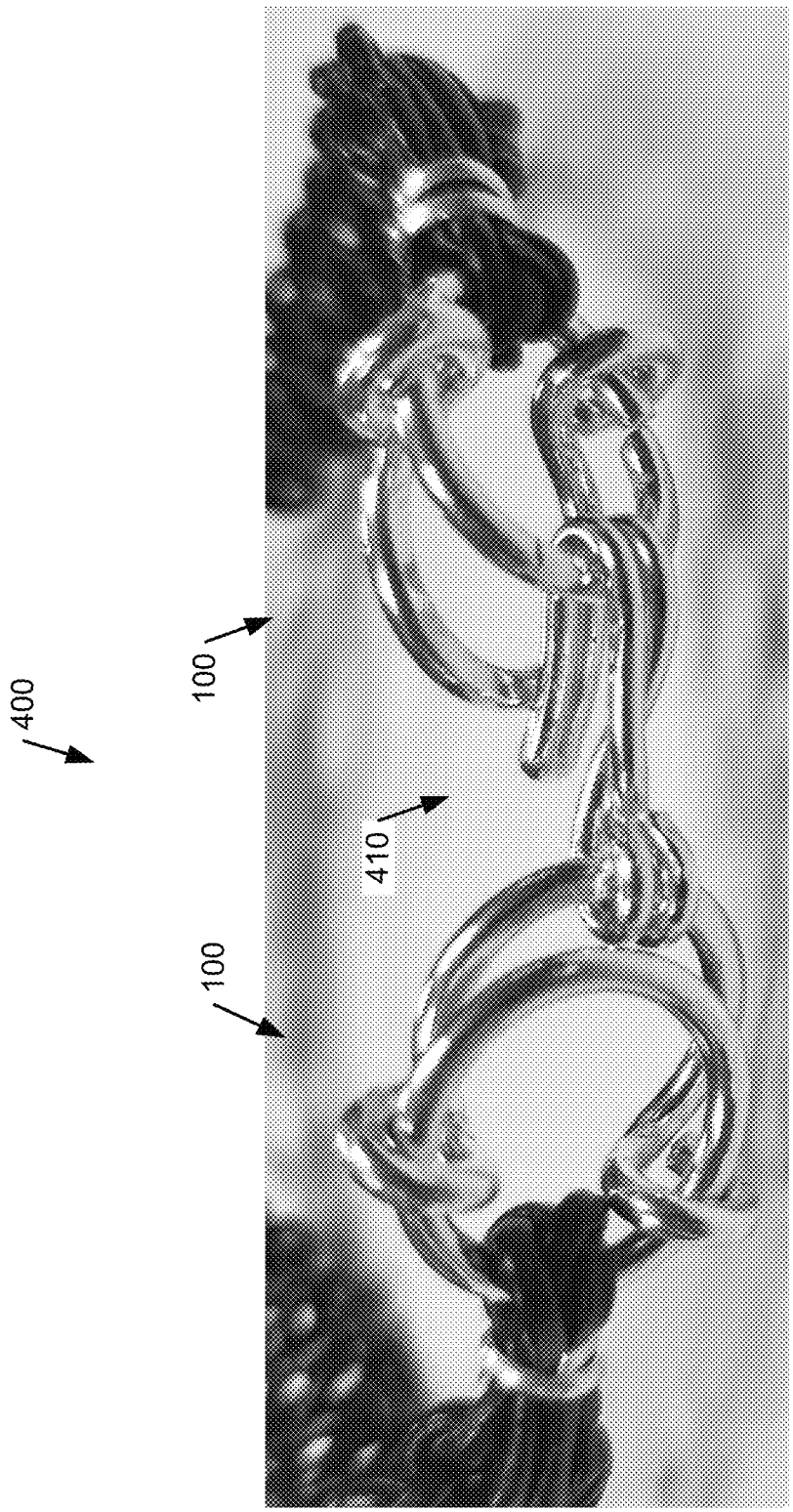
Figure 4D:
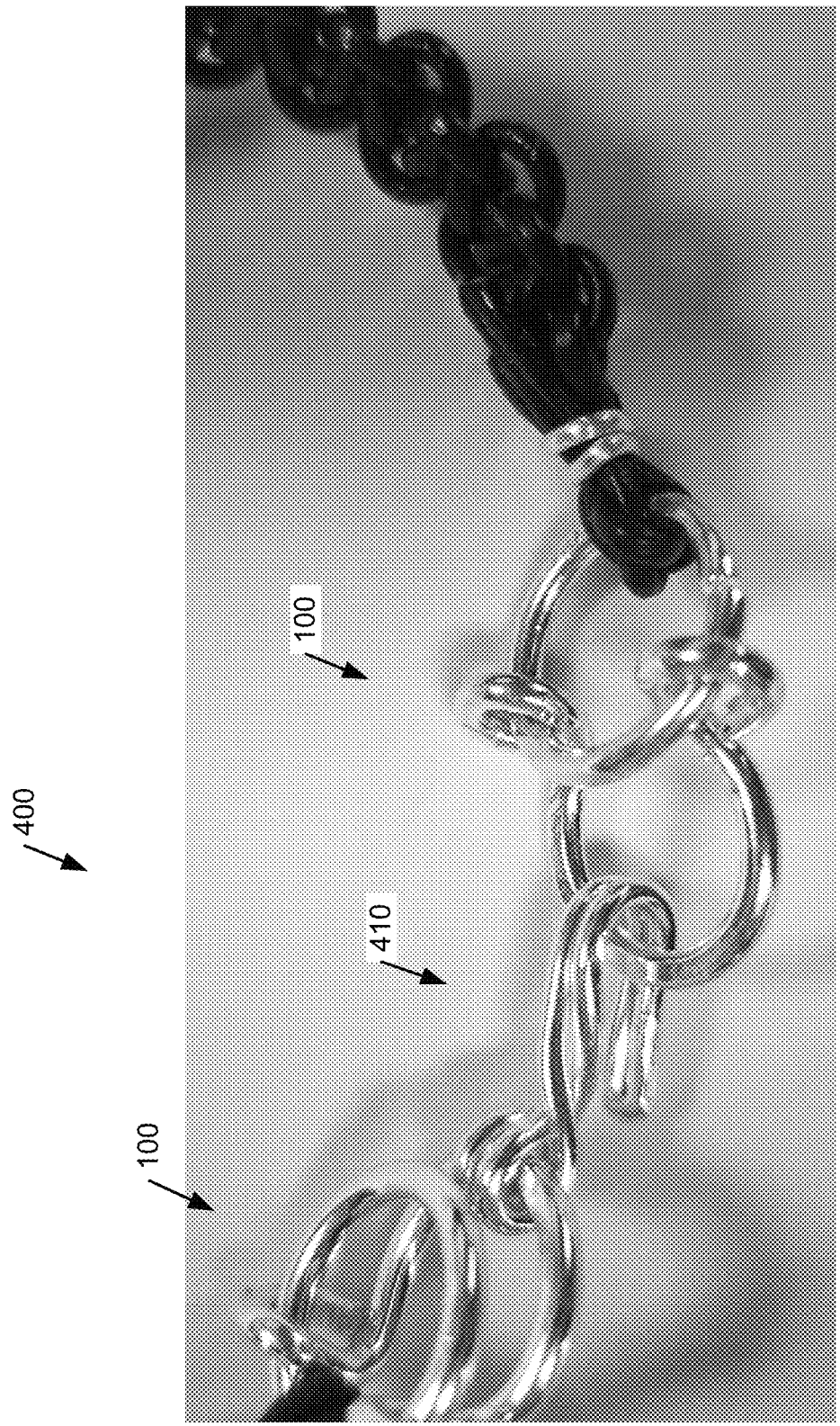

FIGS. 4A-4D illustrate examples of a clasp, such as adjustable length clasps 400 made from the expandable link 100 according to the present disclosure and shown above. For example, as shown in FIGS. 4A-4D, in some implementations, one or more expandable links 100 may be connected to hook and loop 410 or other like connector to enable connection of ends of a necklace, bracelet, or other jewelry to form an adjustable length connecting clasp for the jewelry to enable elongation and retraction of first piece 110 to provide an adjustable linear length hook and loop 410. FIG. 4A illustrates hook of hook and loop 410. FIG. 4B illustrates a retracted first piece 110 for a shortened hook and loop 410. FIG. 4C illustrates a retracted first piece 110 for a shortened hook and loop 410 and wherein first piece 110 is positioned over the hook of hook and loop 410 to lock hook therearound next first piece 110 or next loop or the like. FIG. 4D illustrates an elongated first piece 110 for a lengthened hook and loop 410.

In some implementations, expandable link 100 includes any suitable dimensions.

In some implementations, expandable link 100 is composed of any suitable material. For example, in some implementations, expandable link 100 may be composed of one or more metallic materials, such as steel, brass, copper, silver, gold, or the like. In some implementations, expandable link 100 may be composed of one or more plastic materials, such as polyethylene, polyvinyl chloride, polypropylene, polycarbonate, acrylic, or the like.

In some implementations, expandable link 100 is composed of any suitable form of such material. For example, in some implementations, expandable link 100 may be composed of an elongated form of such material. In some implementations, expandable link 100 may be composed of a cylindrical shaped form of such material. In some implementations, expandable link 100 may be composed of a form of such material having any other suitable shape and/or other feature.

In some implementations, expandable link 100 can have any suitable appearance, such as the examples shown in the above described figures.

In some implementations, an example method of using the expandable link 100, with respect to the above described FIGS. 2A-2C, includes reducing the length of expandable link 100 by positioning first piece 110 so that loop ends 114, 115 are nearer respectively to ends 122, 123 of the second piece 120 or similar next nested link first piece 110. In some implementations, the method includes increasing the length of the expandable link 100 by positioning first piece 110 so that loop ends 114, 115 are farther away respectively from ends 122, 123 of second piece 120 or similar next nested link first piece 110.

In some implementations, first piece 110 remains in a position along second piece 120 until sufficient force is used to reposition first piece 110 to another position along second piece 120.

In some implementations, an example method of using the expandable link 100, with respect to the above described FIGS. 3A-3D, includes connecting a plurality of expandable links 100 together to form an adjustable length necklace, bracelet, or other jewelry 300.

In some implementations, an example method of using the expandable link 100, with respect to the above described FIGS. 4A-4D, includes connecting one or more expandable links 100 to hook and loop 410 or other connectors to form a re-attachable necklace, bracelet, or other jewelry to form an adjustable length connecting clasp 400 for the jewelry.

Figure 5:
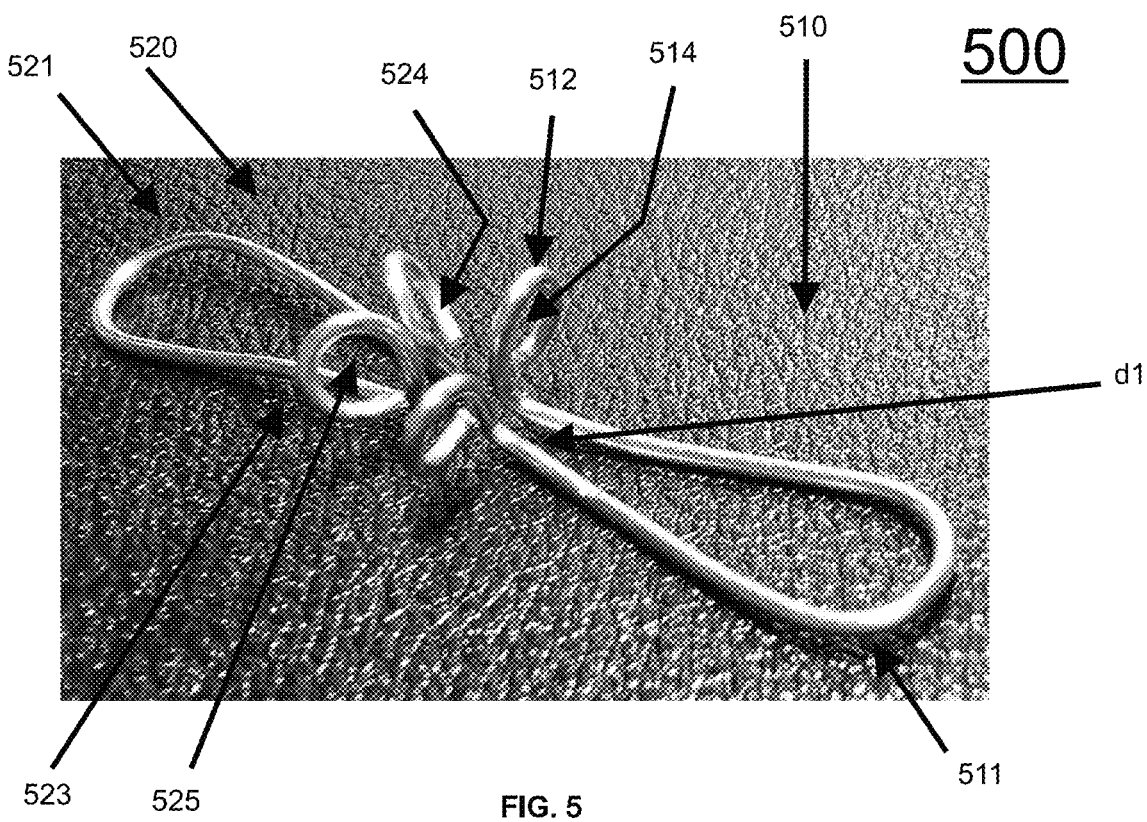
FIGS. 5-10 illustrate examples of rotational two-part hinge made from first elongated loop piece and second extended elongated loop piece according to the present disclosure.
Figure 6:
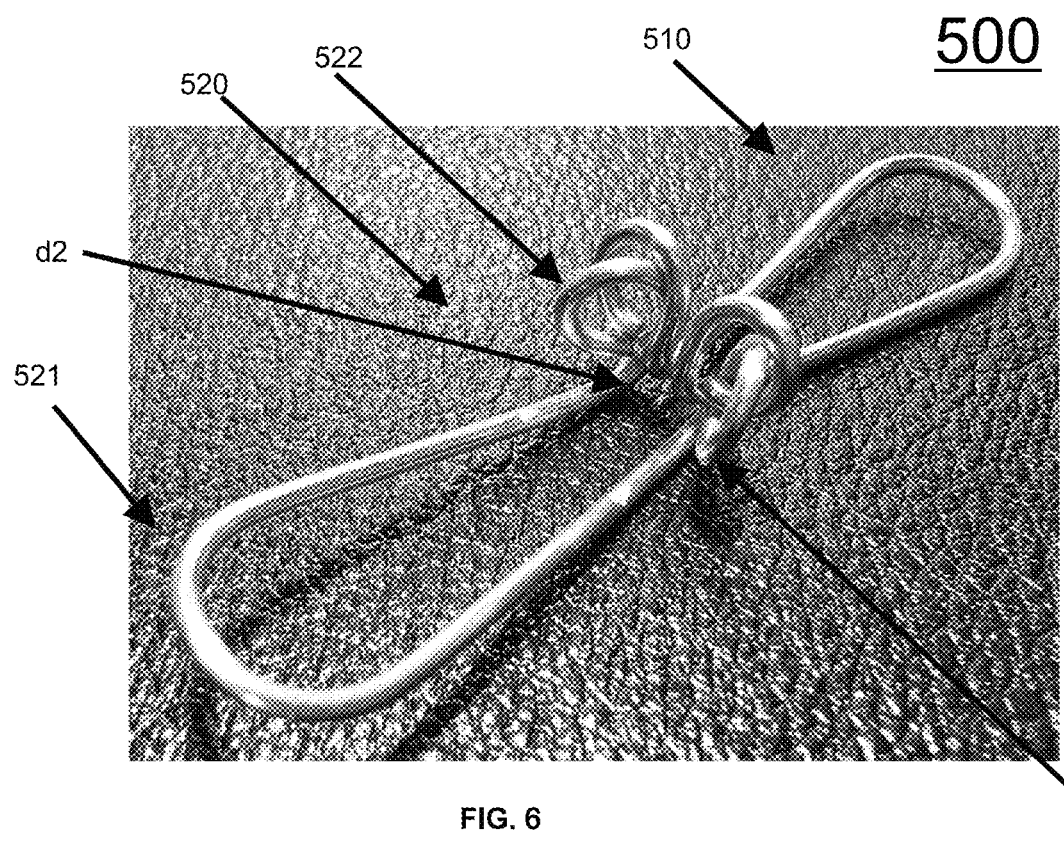

FIG. 5 illustrates an exploded view of an implementation of an example novel hinge 500 according to the present disclosure. FIG. 6 illustrates an assembled view of the novel hinge 500 according to the present disclosure. As shown in FIGS. 5 and 6, in some implementations, the novel hinge 500 includes first piece 510 and a second piece 520.

As shown in FIGS. 5-9, in some implementations, the first piece 510, being an elongated version of first piece 100, includes an elongated loop, such as curved portion 511, first bend 512, second bend 513, first loop end 514, and second loop end 515.

In some implementations, hinge apparatus 500, having first piece 510 of hinge 500 is similar to first piece 110 of the expandable link 100 except that curved portion 511 is more elongated. Furthermore, similar to first bend 112 and second bend 113 of first piece 110 of the expandable link 100, as shown in FIGS. 5 and 6, first bend 512 and second bend 513 of hinge 500 may be bent 90 degrees (or about 90 degrees) from curved portion 511. Similarly, as shown in FIGS. 5 and 6, in some implementations, first loop end 514 is curved outward or clockwise to form the first loop end 514 and second loop end 515 is curved outward or counter-clockwise to form the second loop end 515. In some implementations, second loop end 515 is curved outward in an opposite facing direction from first loop end 514.

Curved portion 511 can be any suitable shape. In some implementations, curved portion 511 is not curved. In some implementations, the portion defined by curved portion 511 is elongated and sized and/or shaped such that the distal end can be grabbed between a person's thumb and index finger to allow a user to apply additional sufficient force (e.g., by squeezing together the sides of curved portion 511) to reposition (retract or elongate for example first pieces 110) first piece 110, as described above.

The first piece 510 may have shapes similar to the first pieces 110A, 110B, or 110C.

As shown in FIG. 5, in some implementations, second piece 520 includes curved portion 521, first bend 522 and second bend 523 of hinge 500 may be bent 90 degrees (or about 90 degrees) from curved portion 521. Similarly, as shown in FIGS. 5 and 6, in some implementations, first loop end 524 is curved outward or clockwise to form the first loop end 524 and second loop end 525 is curved outward or counter-clockwise to form the second loop end 525. In some implementations, second loop end 525 is curved outward in an opposite facing direction from first loop end 524.

In some implementations, second piece 520 of the hinge 500 is similar to first piece 510 except that, as shown in FIGS. 5 and 6, first end 522 may be curved or bent additionally back toward curve portion 521 to form first end loop 524 and second bend 525 may be curved or bent back toward curve portion 521 to form second end loop 523. Furthermore, in some implementations, the distance d2 between first loop end 524 and second loop end 525 of second piece 520 is greater than the distance d1 between first loop end 514 and second loop end 515 of first piece 510, or vice-a-versa. In this way, as shown in FIG. 7, a portion of first piece 510 can extend through second piece 520 between first loop end 524 and second loop end 525 of second piece 520 such that hinge 500 has a greater range or additional range of motion rotating zero degrees to three hundred and sixty degrees.

As discussed in more detail below, in some implementations, loop ends 524, 525 of second piece 520 are configured such that first piece 510 and second piece 520 are interlocked by extending loop ends 524, 525 through loop ends 514, 515, respectively, of first piece 510 and such that the loop ends 514, 515 of first piece 510 can rotate around loop ends 524, 525 of second piece 520, shown in FIGS. 7-10.

Figure 7:
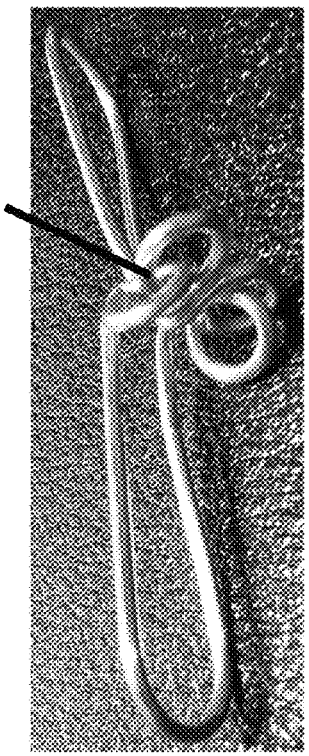
Figure 8:
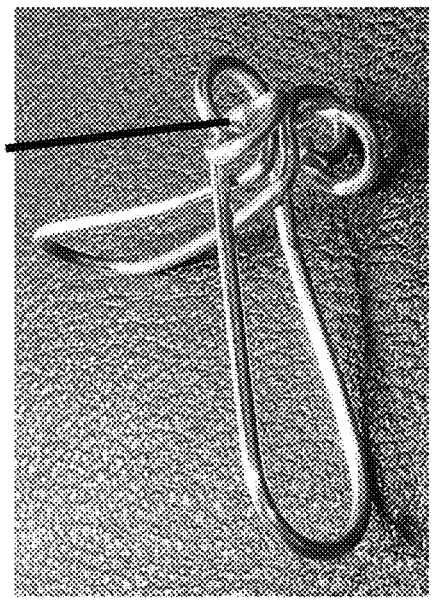
Figure 9:
Figure 10:
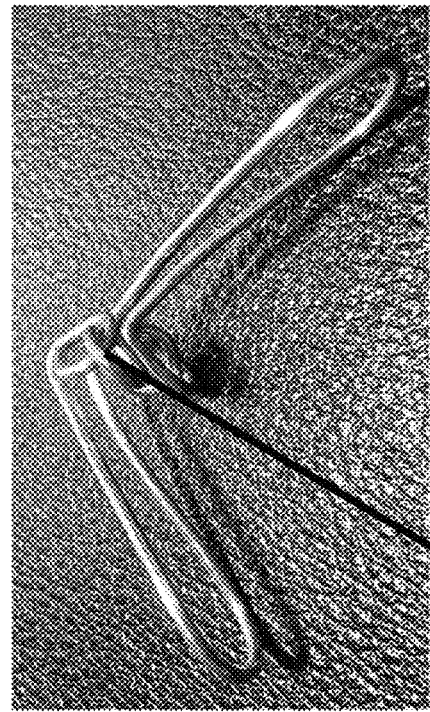

FIGS. 7-10 illustrate various views of hinge 500 according to the present disclosure. FIGS. 6 and 8 illustrate hinge 500 in a neutral position. FIG. 7 illustrates hinge 500 in a fully open position. FIG. 9 illustrates hinge 500 in a partially closed/open position. FIG. 10 illustrates hinge 500 in a fully closed position.

As shown in FIGS. 7-10, in some implementations, first piece 510 and second piece 520 are moveably or rotationally connected together. That is, in some implementations, loop ends 524, 525 of second piece 520 extend respectively through loop ends 514, 515 of first piece 510. In this way, in some implementations, first piece 510 and second piece 520 are moveably rotationally interlocked.

As shown in FIGS. 7-10, in some implementations, first piece 510 and second piece 520 are connected/interlocked such that hinge 500 functions by rotating first piece 510 loop ends 514, 515 around loop ends 524, 525 of second piece 520. For example, as shown in FIGS. 7-10, in some implementations, hinge 500 can be adjusted rotationally by moving the positioning of loop ends 514, 515 to a desired location around loop ends 524, 525 (e.g., L1, L2, L3, L4), of second piece 520.

As shown in FIGS. 7-10, hinge 500 is linear length adjusted by moving curved portions 511 and 521 away or towards each other.

In some implementations, the shape (e.g., the curvature) of first loop end 514 and second loop end 515 of first piece 510 and/or first loop end 524 and second loop end 525 of second piece 520 are configured such that first piece 510 will remain in a position along loop ends 524, 525 of second piece 520 until sufficient force is used to reposition first piece 510 to another position around loop ends 524, 525 second piece 520.

It will be understood by one skilled in the art with the benefit of the present disclosure that components of hinge 500, such as pieces 510, 520, may be made by hand, machine, or any other suitable way. In that regard, bends 512, 513, 522, 523 in the pieces 510, 520, respectively. of about 90 degrees (e.g., indicating 90 degrees, less than 90 degrees, or greater than 90 degrees) described herein will be understood by one skilled in the art to be the result of variation, tolerance, error, etc. during the making of hinge 500 by hand, machine, or other suitable way.

In some implementations, the hinge 500 includes any suitable dimensions.

In some implementations, the hinge 500 is composed of any suitable material. For example, in some implementations, the hinge 500 may be composed of one or more metallic materials, such as steel, brass, copper, silver, gold, or the like. In some implementations, the hinge 500 may be composed of one or more plastic materials, such as polyethylene, polyvinyl chloride, polypropylene, polycarbonate, acrylic, or the like.

In some implementations, hinge 500 is composed of any suitable form of such material. For example, in some implementations, hinge 500 may be composed of an elongated form of such material. In some implementations, hinge 500 is made from wire. In some implementations, hinge 500 may be made from a flexible, round, bar of metal. In some implementations, hinge 500 may be composed of a cylindrical shaped form of such material. In some implementations, hinge 500 may be composed of a form of such material having any other suitable shape and/or other feature.

In some implementations, hinge 500 can have any suitable appearance, such as the examples shown in the above-described figures.

In some implementations, hinge 500 is configured to be used with jewelry.

In some implementations, the hinge 500 may be configured to be used in any other suitable usage.

Figure 11:
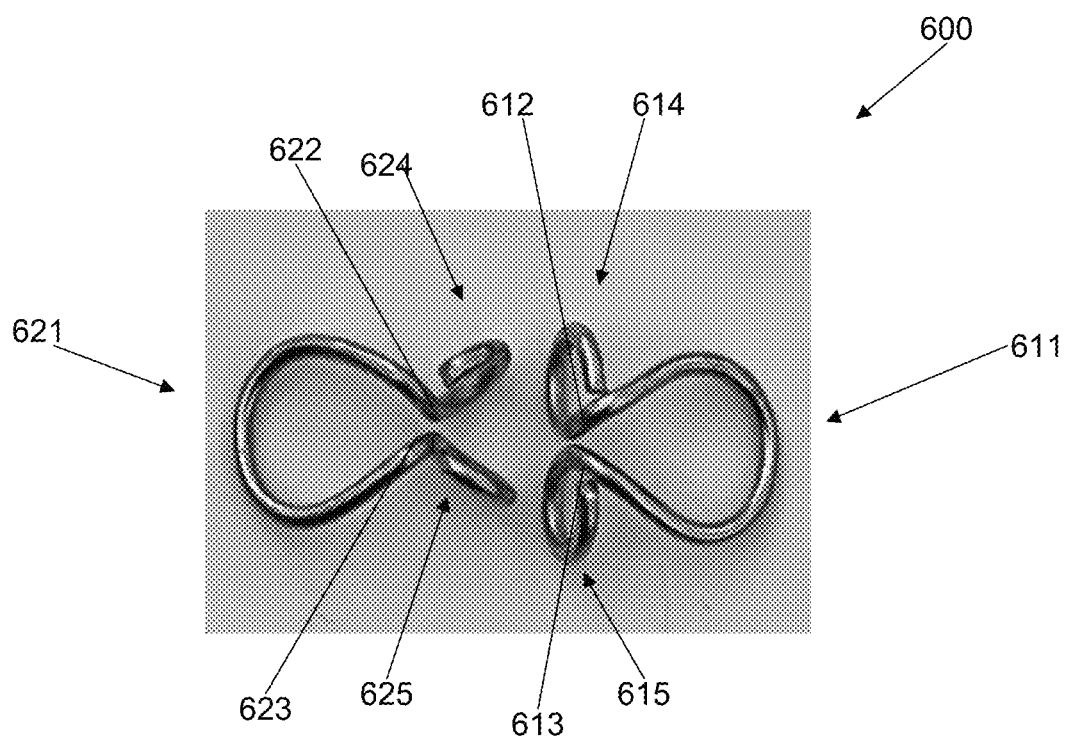
FIGS. 11-12 illustrate examples of rotational two-part hinge made from first loop piece and second loop piece according to the present disclosure.

As shown in FIGS. 10-11, in some implementations, second piece 620 includes second elongated portion, circular or arcing section in a first plane, such as curved portion 621 fourth plane, first bend 622 in fifth plane, and second bend 623 in sixth plane of hinge 600 may be bent 90 degrees (or about perpendicular or acute) from curved portion 621. Similarly, in some implementations, third opening, such as first loop end 624 is curved outward or counter-clockwise to form first loop end 624 and fourth opening, such as second loop end 625 is curved outward or clockwise to form second loop end 625.

In some implementations, first piece 610 includes first elongated portion, circular or arcing section in a first plane, such as curved portion 611, first bend 612 in second plane, second bend 613 in third plane of hinge 600 may be bent 90 degrees (or about perpendicular, or acute) from curved portion 611. Similarly, in some implementations, first opening, such as first loop end 614 is curved outward or counter-clockwise to form first loop end 614 and second opening, such as second loop end 615 is curved outward or clockwise to form second loop end 625.

As shown in FIG. 11, in some implementations, first piece 610 and second piece 621 are connected/interlocked such that hinge 600 functions by rotating first piece 611 loop ends 614, 615 around curved loop ends 624, 625 of second piece 621.

Figure 12:
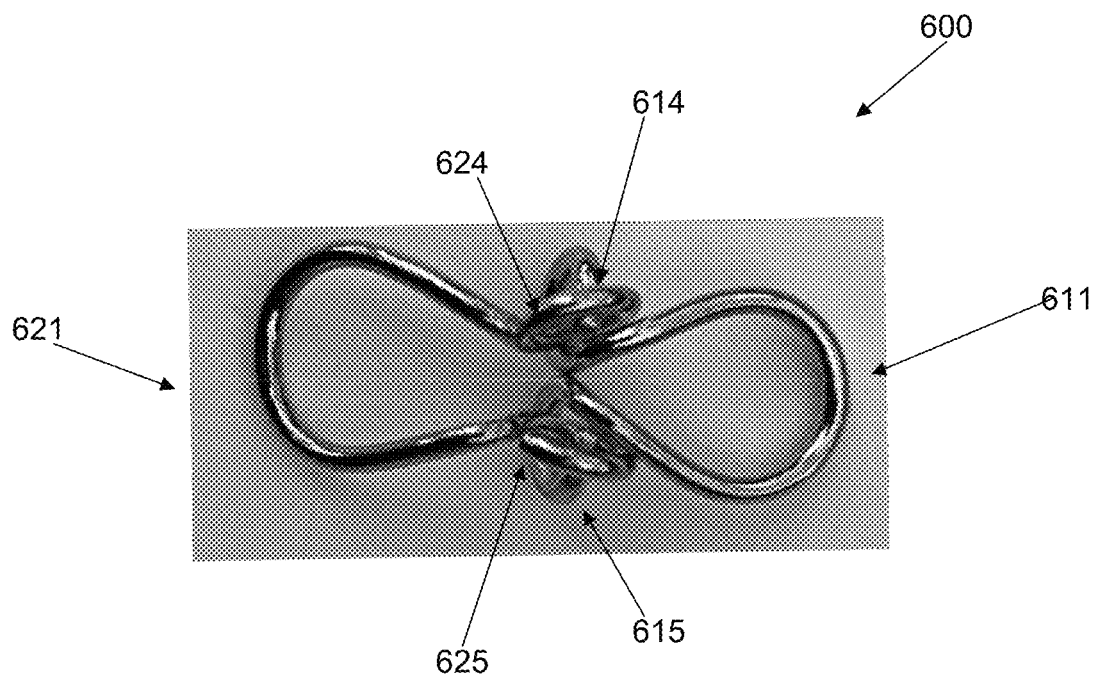
Figure 13:
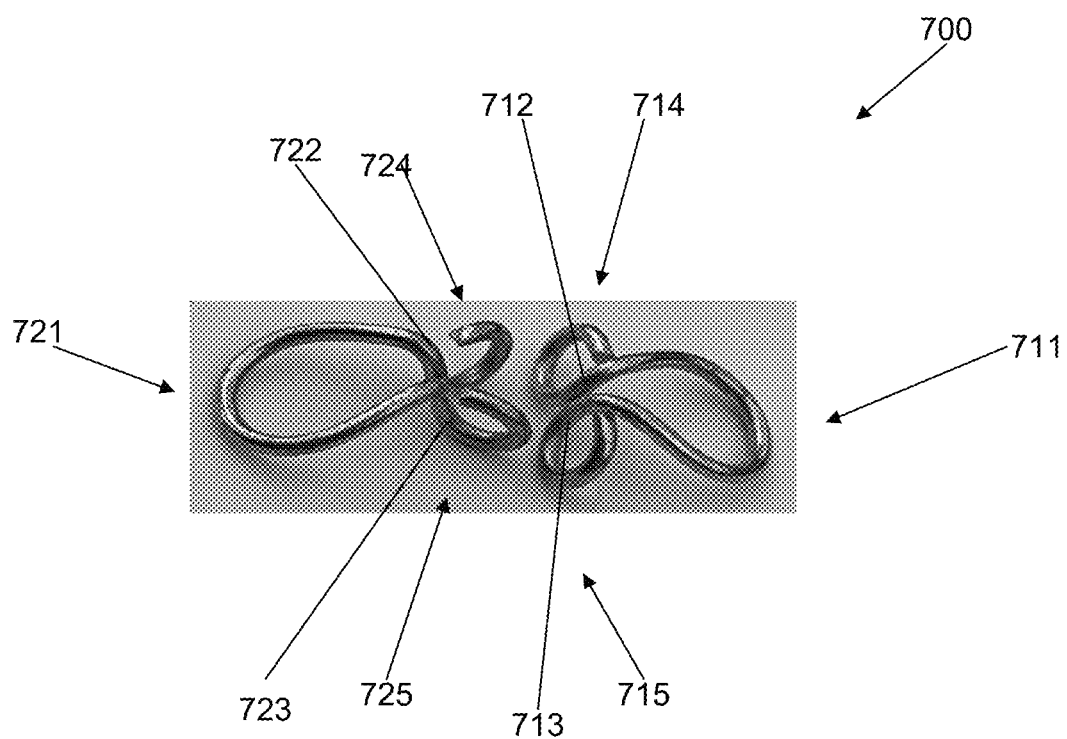
FIGS. 13-14 illustrate examples of rotational two-part hinge made from first loop piece and second loop piece with a cross-over according to the present disclosure.
Figure 14:
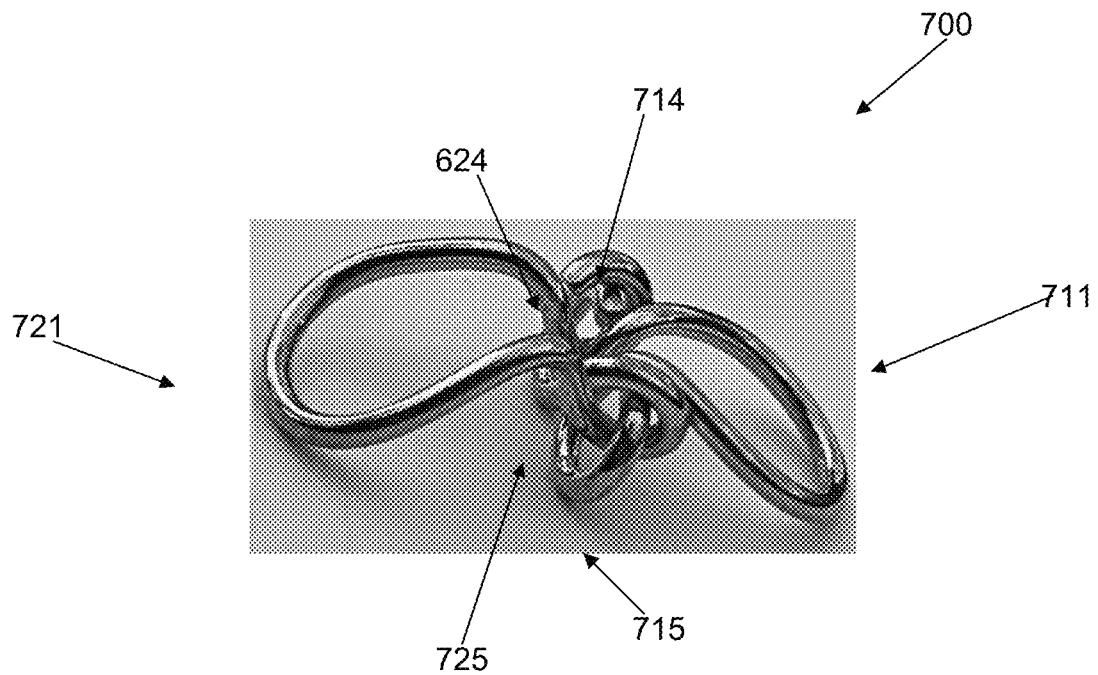

As shown in FIGS. 12-13, in some implementations, second piece 720 includes second elongated portion, circular or arcing section in a fourth plane, curved portion 721, first bend 722 in a fifth plane, and second bend 723 in a sixth plane of hinge 700, which may be bent 90 degrees (or about perpendicular, or acute) from curved portion 721. Similarly, in some implementations, third opening, such as first loop end 724 is curved outward or counter-clockwise to form the first loop end 724 and fourth opening, such as second loop end 725 is curved outward or counter-clockwise to form the second loop end 725.

In some implementations, first piece 710 includes first elongated portion, circular or arcing section in a first plane curved portion 711, first bend 712 in a second plane and second bend 713 in a third plane of hinge 700 may be bent 90 degrees (or about perpendicular, or acute) from curved portion 711. Similarly, in some implementations, first loop end 714 is curved outward or clockwise to form first opening, such as first loop end 714 and second opening, such second loop end 715 is curved outward or counter-clockwise to form the second loop end 725.

As shown in FIG. 13, in some implementations, the first piece 710 and the second piece 720 are connected/interlocked such that the hinge 700 functions by rotating first piece 711 loop ends 714, 715 around curved loop ends 724, 725 of second piece 720.

In some implementations, loop ends 724, 725 extending from curved portion 711 cross over one another, or each other to the opposite sides of curved portion 711 (e.g., in contrast to curved loop ends 624, 625 of first piece 610 in FIGS. 11-12). In some implementations, loop ends 724, 725 may cross over (first end of elongated portion crosses over second end of elongated portion) before or after bending from curved portion 711.

Figure 15:
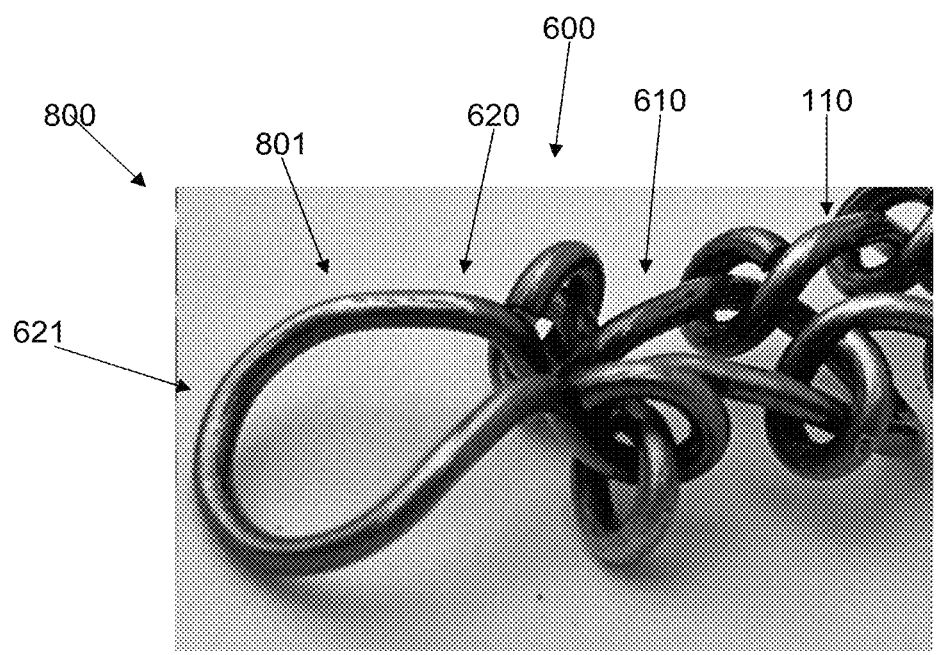
FIGS. 15-16 illustrate examples of adjustable length clasps made from first pieces of the expandable link of FIGS. 11-12 and FIG. 1B shown retracted according to the present disclosure.
Figure 16:
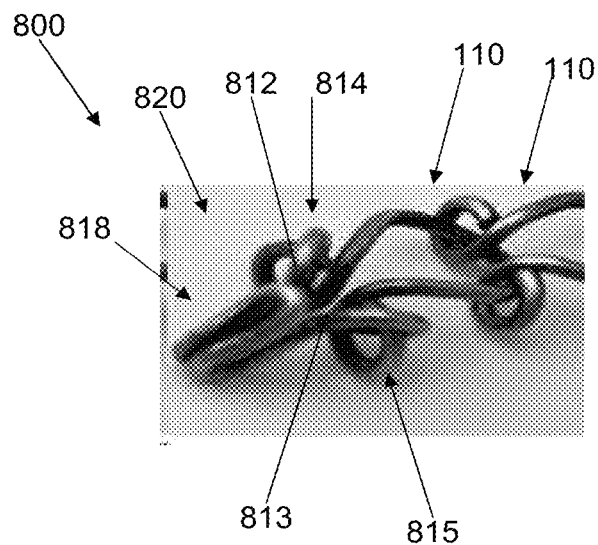

As shown in FIGS. 15-16, in some implementations, examples of adjustable length links clasps 800 made from hinge 600 and expandable link 100 according to the present disclosure and shown above. For example, as shown in FIG. 15, in some implementations, first piece 801 of clasp 800 may include hinge 600 configured by interlinking first piece 610 with second piece 620 and may be interlinked with first expandable link 100 and a plurality of expandable links 100 thereafter to form second end piece 801 of clasp 800 or other like connectors. Second piece 620 of first piece 801 may be utilized as loop end of claps 800.

For example, as shown in FIG. 16, in some implementations, second piece 802 includes hook portion 818, first bend 812 and second bend 813 of clasp 800, which may be angled or a 'Y' configuration (or about 45 degrees) from hook portion 818. Similarly, in some implementations, first loop end 814 is curved outward or clockwise to form first loop end 814 and second loop end 815 may be curved outward or clockwise to form second loop end 815. Second piece 802 may be interlinked with first expandable links 100 and a plurality of expandable links 100 thereafter to form second end piece 801 of clasp 800 or other like connectors.

Second piece 802 may be releasably connected to first piece 801 to enable connection of ends of a necklace, bracelet, or other jewelry to form an adjustable length (between a first position and second position being a first length and a second length which is longer in length) connecting clasp for the jewelry to enable elongation and retraction of expandable links 100 to provide an adjustable linear length jewelry with clasp 800.

In some implementations, the expandable link 100 includes comprises any suitable dimensions.

In some implementations, the expandable link 100 is composed of any suitable material. For example, in some implementations, the expandable link 100 may be composed of one or more metallic materials, such as steel, brass, copper, silver, or gold, or the like. In some implementations, the expandable link 100 may be composed of one or more plastic materials, such as polyethylene, polyvinyl chloride, polypropylene, polycarbonate, or acrylic, or the like.

In some implementations, the expandable link 100 is composed of any suitable form of such material. For example, in some implementations, the expandable link 100 may be composed of an elongated form of such material. In some implementations, the expandable link 100 may be composed of a cylindrical shaped form of such material. In some implementations, the expandable link 100 may be composed of a form of such material having any other suitable shape and/or other feature.

In some implementations, the expandable link 100 can have any suitable appearance, such as the examples shown in the above described figures.

The figures, including photographs and drawings, comprised herewith may represent one or more implementations of a hinge according to the present disclosure.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the disclosure. One skilled in the relevant art will recognize, however, that embodiments of the disclosure can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A hinge apparatus for jewelry comprising:
   a first piece and a second piece;
   said first piece having a first elongated portion extending in a first plane, a first end extending from said first elongated portion in a second plane and curved to form a first opening, and a second end extending from said first elongated portion in a third plane and curved to form a second opening wherein the second plane and third plane are substantially common and substantially perpendicular to said first plane;
   said second piece having a second elongated portion extending in a fourth plane, a first end extending from said second elongated portion in a fifth plane and curved to form a third opening, and a second end extending from said second elongated portion in a sixth plane and curved to form a fourth opening wherein said fifth plane and said sixth plane are substantially common and substantially acute to said fourth plane; and
   said first opening and said second opening of said first piece interlocked with said third opening and said fourth opening of said second piece, respectively to enable rotational movement of said first piece relative to said second piece.

2. The hinge apparatus of claim 1, wherein said first elongated portion is configured to rotate relative to said second elongated portion to adjust a relative position of said first piece and said second piece between a fully open position and a fully closed position.

3. The hinge apparatus of claim 2, wherein a length and a width of said second elongated portion is greater than said first elongated portion, thereby allowing said first piece to extend through said second piece and rotate an additional range of motion.

4. The hinge apparatus of claim 1, wherein said first piece and said second piece are formed from a wire material.

5. The hinge apparatus of claim 4, wherein said first piece and said second piece are formed from a metallic material selected from the group consisting of steel, platinum, brass, copper, silver, and gold.

6. The hinge apparatus of claim 1, wherein said first end and said second end of said first elongated portion are curved outward in opposite directions to form said first opening and said second opening, respectively.

7. The hinge apparatus of claim 1, wherein said first end and said second end of said second elongated portion are curved outward in opposite directions to form said third opening and said fourth opening, respectively.

8. A hinge apparatus for jewelry comprising:
   a first piece and a second piece;
   said first piece having a first elongated portion extending in a first plane, a first end extending from said first elongated portion in a second plane and curved to form a first opening, and a second end extending from said first elongated portion in a third plane and curved to form a second opening wherein the second plane and third plane are substantially common and substantially perpendicular to said first plane;
   said second piece having a second elongated portion extending in a fourth plane, a first end extending from said second elongated portion in a fifth plane and curved to form a third opening, and a second end extending from said second elongated portion in a sixth plane and curved to form a fourth opening, wherein said first end and said second end cross over to an opposite side, wherein said fifth plane and said sixth plane are substantially common and substantially perpendicular to said fourth plane; and
   said first opening and said second opening of said first piece interlocked with said third opening and said fourth opening of said second piece, respectively to enable rotational movement of said first piece-relative to said second piece.

9. The hinge apparatus of claim 8, wherein said first elongated portion is configured to rotate relative to said second piece to adjust a relative position of said first piece and said second piece between a fully open position and a fully closed position.

10. The hinge apparatus of claim 8, wherein said first end and said second end of said first elongated portion are curved outward in opposite directions to form said first opening and said second opening, respectively.

11. The hinge apparatus of claim 8, wherein said first end and said second end of said second elongated portion are curved outward in opposite directions to form said third opening and said fourth opening, respectively.

12. The hinge apparatus of claim 8, wherein a length and a width of said second elongated portion is greater than said first elongated portion, thereby allowing said first piece to extend through said second piece and rotate through an additional range of motion.

13. The hinge apparatus of claim 12, wherein said first piece and said second piece are formed from a metallic material selected from the group consisting of steel, platinum, brass, copper, silver, and gold.

14. The hinge apparatus of claim 8, wherein said first piece and said second piece are formed from a wire material.

\* \* \* \* \*